US012783041B2

(12) United States Patent
Chebbi et al.

(10) Patent No.: US 12,783,041 B2
(45) Date of Patent: Nov. 3, 2026

(54) AVOIDING COMMANDED SYSTEM-ON-CHIP (SoC) SLEEP ENTRY FAILURE IN PROCESSOR-BASED DEVICES

(71) Applicant: QUALCOMM Incorporated, San Diego, CA (US)

(72) Inventors: Shriharsha Chebbi, Hyderabad (IN); Nirav Narendra Desai, Hyderabad (IN); Lakshmi Narayana Panuku, Hyderabad (IN); Anirudh Ghayal, Secunderabad (IN); Trang Nguyen, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 103 days.

(21) Appl. No.: 19/012,581

(22) Filed: Jan. 7, 2025

(65) Prior Publication Data

US 2026/0194962 A1 Jul. 9, 2026

(51) Int. Cl.

| | |
|---|---|
| ***G06F 1/3293*** | (2019.01) |
| ***G06F 1/3206*** | (2019.01) |
| ***G06F 1/3228*** | (2019.01) |
| ***G06F 1/3287*** | (2019.01) |
| ***G06F 9/54*** | (2006.01) |
| ***G06F 11/07*** | (2006.01) |
| ***H04L 1/1829*** | (2023.01) |

(52) U.S. Cl.

CPC .............. *G06F 1/3293* (2013.01); *G06F 9/54* (2013.01); *H04L 1/1851* (2013.01); *G06F 1/3206* (2013.01); *G06F 1/3228* (2013.01); *G06F 1/3287* (2013.01); *G06F 11/0757* (2013.01)

(58) Field of Classification Search

CPC ........ G06F 1/3293; G06F 9/54; G06F 1/3287; G06F 1/3206; G06F 11/0757; G06F 1/3228; H04L 1/1851

USPC .................................... 713/323, 330; 714/55

See application file for complete search history.

(56) References Cited

U.S. PATENT DOCUMENTS

2014/0173298 A1* 6/2014 Bircher ................. G06F 1/3203 713/300
2018/0113764 A1* 4/2018 Bhandari ............ G06F 11/0712
2021/0303053 A1* 9/2021 Lake ..................... G06F 1/3206
2022/0011842 A1* 1/2022 Reddy ....................... G06F 1/30

(Continued)

*Primary Examiner* — Ji H Bae

(74) *Attorney, Agent, or Firm* — Withrow & Terranova, PLLC

(57) ABSTRACT

Avoiding commanded System-on-Chip (SoC) sleep entry failure in processor-based devices is disclosed herein. In some aspects, a processor-based device comprises a low-power mode (LPM) compliance logic circuit that receives, from each of a plurality of subsystem circuits, a corresponding indication to start a corresponding No Acknowledgement (NACK) timer of a plurality of NACK timers. The LPM compliance logic circuit generates a plurality of NACK timer status indications corresponding to the plurality of NACK timers, wherein each NACK timer status indication is set to a first value if the corresponding NACK timer is cancelled by the corresponding subsystem circuit upon entry into an LPM, or is set to a second value if the corresponding NACK timer expires without being cancelled. The LPM compliance logic circuit generates an LPM compliance status indication in response to the NACK timer status indications and an enable indication.

20 Claims, 14 Drawing Sheets

(56) References Cited

U.S. PATENT DOCUMENTS

| | | | | |
|---|---|---|---|---|
| 2023/0185349 | A1* | 6/2023 | Chen | G06F 1/14<br>713/300 |
| 2024/0103601 | A1* | 3/2024 | Yang | G06F 1/3296 |
| 2025/0306664 | A1* | 10/2025 | Shah | G06F 1/324 |
| 2025/0362733 | A1* | 11/2025 | Chebbi | G06F 1/3206 |
| 2026/0064184 | A1* | 3/2026 | Lee | G06F 1/3206 |
| 2026/0099188 | A1* | 4/2026 | Chebbi | G06F 1/3287 |

* cited by examiner

AVOIDING COMMANDED SYSTEM-ON-CHIP (SoC) SLEEP ENTRY FAILURE IN PROCESSOR-BASED DEVICES

TECHNICAL FIELD

The technology of the disclosure relates generally to low-power mode (LPM) or "sleep" entry in Systems-on-Chip (SoCs) in processor-based devices, and, in particular, to avoiding SoC sleep entry failure.

BACKGROUND

A System-on-Chip (SoC) is an integrated circuit comprising most or all elements of a processor-based device, including one or more Central Processing Units (CPUs), memory devices, graphics processing units (GPUs), and/or digital signal processors (DSPs), as non-limiting examples, integrated as a single chip. Due to their small size, high performance, and low power consumption, SoCs are conventionally used in a wide variety of processor-based devices. This includes devices used in automotive applications, Internet-of-Things (IoT) devices, and Extended Reality (XR) devices.

Management of power consumption is a critical concern in many SoCs, particularly in battery-powered devices. Accordingly, conventional SoCs are configured to employ low-power modes (LPMs) to reduce power consumption under different operating circumstances. A SoC used in some applications may configured to automatically enter LPM when the SoC detects that its workload has decreased below a threshold. However, in the case of automotive, IoT, and XR applications, a SoC may be configured to enter LPM only in response to an external trigger (e.g., a vehicle's ignition being turned off, in the example of automotive applications). Thus, such SoCs do not enter LPM opportunistically, but rather use a commanded mode of LPM entry.

However, even when using the commanded mode of LPM entry, a SoC may not be able to successfully enter LPM. For example, one or more subsystems of the SoC may include timers or interrupts that are non-deferable, and thereby prevent the subsystem from entering its idle LPM. This, in turn, prevents the SoC from entering its SoC-level sleep state, which can result in the entire SoC suffering a crash. In addition to interrupting the normal operation of the SoC, a SoC crash also causes an increased number of warm boots of the SoC, negatively affecting the SoC's power consumption.

Accordingly, it is desirable to provide a mechanism to more effectively ensure that the SoC is able to successfully enter sleep state.

SUMMARY OF THE DISCLOSURE

Aspects disclosed in the detailed description include avoiding commanded System-on-Chip (SoC) sleep entry failure in processor-based devices. Related apparatus, methods, and computer-readable media are also disclosed. In this regard, in some exemplary aspects disclosed herein, a processor-based device such as a SoC includes a low-power mode (LPM) compliance logic circuit that provides a plurality of No Acknowledgement (NACK) timers that each corresponds to a subsystem circuit of a plurality of subsystem circuits of the processor-based device. In exemplary operation, the LPM compliance logic circuit receives, from each subsystem circuit of the plurality of subsystem circuits, a corresponding indication to start the corresponding NACK timer. In some aspects, each subsystem circuit may transmit the indication to start its corresponding NACK timer in response to receiving an interprocess communication (IPC) from an Application Processor Subsystem (APSS) circuit, wherein the IPC commands LPM entry to the subsystem circuit. Some aspects may also provide that each subsystem circuit may identify and terminate any terminable processes being executed by the subsystem circuit, and/or may place any non-terminable processes in a hibernation state in a memory device of the processor-based device.

The LPM compliance logic circuit next generates a plurality of NACK timer status indications corresponding to the plurality of NACK timers. Each NACK timer status indication is set to a first value (e.g., a value of true or one (1), as non-limiting examples) by the LPM compliance logic circuit if the corresponding NACK timer is cancelled by the corresponding subsystem circuit upon entry into an LPM, or is set to a second value (e.g., a value of false or zero (0), as non-limiting examples) if the corresponding NACK timer expires without being cancelled. The LPM compliance logic circuit then receives an enable indication from an Electrically Independent Island (EII)/Safety Island (SAIL) circuit of the processor-based device. According to some aspects, the EII/SAIL circuit may transmit the enable indication in response to receiving an IPC commanding LPM entry from the APSS circuit. In response to receiving the enable indication, the LPM compliance logic circuit generates an LPM compliance status indication in response to the plurality of NACK timer status indications and the enable indication. The LPM compliance status indication may comprise, e.g., a result of a logical AND operation on the plurality of NACK timer status indications and the enable indication. The LPM compliance logic circuit then transmits the LPM compliance status indication to the EII/SAIL circuit.

In some aspects, each subsystem circuit may be configured to determine whether entry into the LPM was successful. If so, the subsystem circuit transmits a cancellation indication to cancel the corresponding NACK timer of the plurality of NACK timers to the LPM compliance logic circuit.

Some aspects may provide that, after expiration of a failure window timeout, the EII/SAIL circuit may receive the LPM compliance status indication from the LPM compliance logic circuit. If the EII/SAIL circuit determines that the LPM compliance status indication indicates at least one failure to enter LPM (e.g., by having a value of false or zero (0), as a non-limiting example), the EII/SAIL circuit transmits an LPM retry request to the APSS circuit, which transmits another IPC commanding LPM entry to each subsystem circuit of the plurality of subsystem circuits. If the EII/SAIL circuit subsequently determines that the LPM retry request was unsuccessful, the EII/SAIL circuit may transmit a failed LPM entry notification to a microcontroller unit (MCU) circuit of the processor-based device.

In another aspect, a processor-based device is provided. The processor-based device comprises an EII/SAIL circuit, a plurality of subsystem circuits, and an LPM compliance logic circuit. The LPM compliance logic circuit comprises a plurality of NACK timers that each correspond to a subsystem circuit of the plurality of subsystem circuits. The LPM compliance logic circuit is configured to receive, from each subsystem circuit of the plurality of subsystem circuits, a corresponding indication to start the corresponding NACK timer of the plurality of NACK timers. The LPM compliance logic circuit is further configured to generate a plurality of NACK timer status indications corresponding to the plurality of NACK timers, wherein each NACK timer status indication is set to a first value if the corresponding NACK timer is cancelled by the corresponding subsystem circuit upon entry into an LPM, and each NACK timer status indication is set to a second value if the corresponding NACK timer expires without being cancelled. The LPM compliance logic circuit is also configured to receive, from the EII/SAIL circuit, an enable indication. The LPM compliance logic circuit is additionally configured to, responsive to receiving the enable indication, generate an LPM compliance status indication in response to the plurality of NACK timer status indications and the enable indication, and transmit the LPM compliance status indication to the EII/SAIL circuit.

In another aspect, a method for avoiding commanded SoC sleep entry failure in processor-based devices is disclosed. The method comprises receiving, by an LPM compliance logic circuit from each subsystem circuit of a plurality of subsystem circuits, a corresponding indication to start a corresponding NACK timer of a plurality of NACK timers of the LPM compliance logic circuit. The method further comprises generating, by the LPM compliance logic circuit, a plurality of NACK timer status indications corresponding to the plurality of NACK timers, wherein each NACK timer status indication is set to a first value if the corresponding NACK timer is cancelled by the corresponding subsystem circuit upon entry into an LPM, and each NACK timer status indication is set to a second value if the corresponding NACK timer expires without being cancelled. The method also comprises receiving, by the LPM compliance logic circuit from an EII/SAIL circuit, an enable indication. The method additionally comprises, responsive to receiving the enable indication, generating, by the LPM compliance logic circuit, an LPM compliance status indication in response to the plurality of NACK timer status indications and the enable indication, and transmitting, by the LPM compliance logic circuit, the LPM compliance status indication to the EII/SAIL circuit.

In another aspect, a non-transitory computer-readable medium is disclosed. The non-transitory computer-readable medium stores computer-executable instructions that, when executed, cause a processor-device of a processor-based device to receive, from each subsystem circuit of a plurality of subsystem circuits, a corresponding indication to start a corresponding NACK timer of a plurality of NACK timers. The computer-executable instructions further cause the processor-device to generate a plurality of NACK timer status indications corresponding to the plurality of NACK timers, wherein each NACK timer status indication is set to a first value if the corresponding NACK timer is cancelled by the corresponding subsystem circuit upon entry into an LPM, and each NACK timer status indication is set to a second value if the corresponding NACK timer expires without being cancelled. The computer-executable instructions also cause the processor-device to receive an enable indication from an EII/SAIL circuit. The computer-executable instructions additionally cause the processor-device to, responsive to receiving the enable indication, generate an LPM compliance status indication in response to the plurality of NACK timer status indications and the enable indication, and transmit the LPM compliance status indication to the EII/SAIL circuit.

DETAILED DESCRIPTION

Figure 1A:
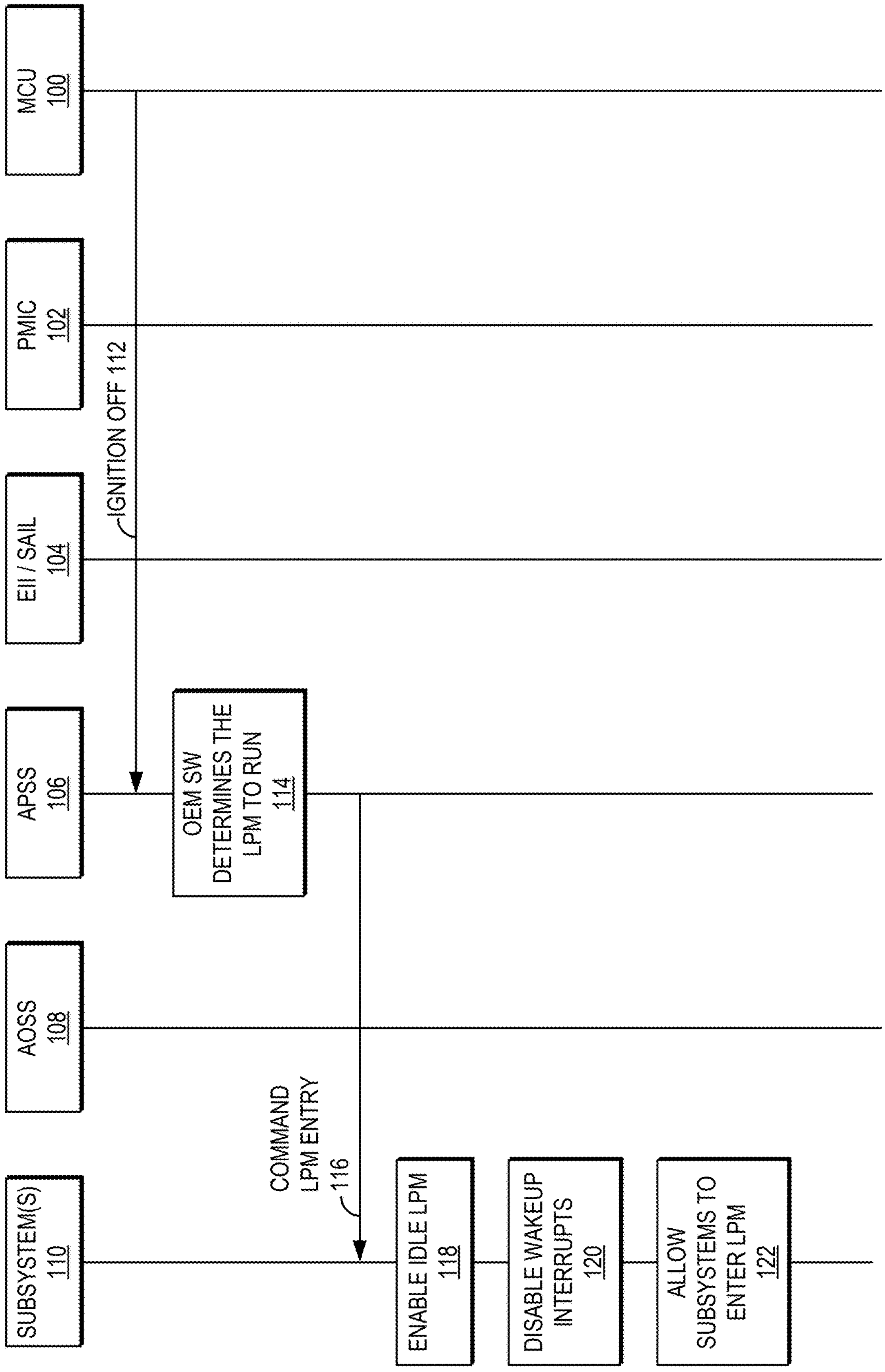
FIGS. 1A-1C provide a diagram illustrating exemplary operations and communications flows between elements of a conventional System-on-Chip (SoC) when attempting to enter a commanded low-power mode (LPM), according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like used herein are intended to distinguish between similarly named elements, and do not indicate an ordinal relationship between such elements unless otherwise expressly indicated.

Aspects disclosed in the detailed description include avoiding commanded System-on-Chip (SoC) sleep entry failure in processor-based devices. Related apparatus, methods, and computer-readable media are also disclosed. In this regard, in some exemplary aspects disclosed herein, a processor-based device such as a SoC includes a low-power mode (LPM) compliance logic circuit that provides a plurality of No Acknowledgement (NACK) timers that each corresponds to a subsystem circuit of a plurality of subsystem circuits of the processor-based device. In exemplary operation, the LPM compliance logic circuit receives, from each subsystem circuit of the plurality of subsystem circuits, a corresponding indication to start the corresponding NACK timer. In some aspects, each subsystem circuit may transmit the indication to start its corresponding NACK timer in response to receiving an interprocess communication (IPC) from an Application Processor Subsystem (APSS) circuit, wherein the IPC commands LPM entry to the subsystem circuit. Some aspects may also provide that each subsystem circuit may identify and terminate any terminable processes being executed by the subsystem circuit, and/or may place any non-terminable processes in a hibernation state in a memory device of the processor-based device.

The LPM compliance logic circuit next generates a plurality of NACK timer status indications corresponding to the plurality of NACK timers. Each NACK timer status indication is set to a first value (e.g., a value of true or one (1), as non-limiting examples) by the LPM compliance logic circuit if the corresponding NACK timer is cancelled by the corresponding subsystem circuit upon entry into an LPM, or is set to a second value (e.g., a value of false or zero (0), as non-limiting examples) if the corresponding NACK timer expires without being cancelled. The LPM compliance logic circuit then receives an enable indication from an Electrically Independent Island (EII)/Safety Island (SAIL) circuit of the processor-based device. According to some aspects, the EII/SAIL circuit may transmit the enable indication in response to receiving an IPC commanding LPM entry from the APSS circuit. In response to receiving the enable indication, the LPM compliance logic circuit generates an LPM compliance status indication in response to the plurality of NACK timer status indications and the enable indication. The LPM compliance status indication may comprise, e.g., a result of a logical AND operation on the plurality of NACK timer status indications and the enable indication. The LPM compliance logic circuit then transmits the LPM compliance status indication to the EII/SAIL circuit.

In some aspects, each subsystem circuit may be configured to determine whether entry into the LPM was successful. If so, the subsystem circuit transmits a cancellation indication to cancel the corresponding NACK timer of the plurality of NACK timers to the LPM compliance logic circuit.

Some aspects may provide that, after expiration of a failure window timeout, the EII/SAIL circuit may receive the LPM compliance status indication from the LPM compliance logic circuit. If the EII/SAIL circuit determines that the LPM compliance status indication indicates at least one failure to enter LPM (e.g., by having a value of false or zero (0), as a non-limiting example), the EII/SAIL circuit transmits an LPM retry request to the APSS circuit, which transmits another IPC commanding LPM entry to each subsystem circuit of the plurality of subsystem circuits. If the EII/SAIL circuit subsequently determines that the LPM retry request was unsuccessful, the EII/SAIL circuit may transmit a failed LPM entry notification to a microcontroller unit (MCU) circuit of the processor-based device.

Figure 1B:
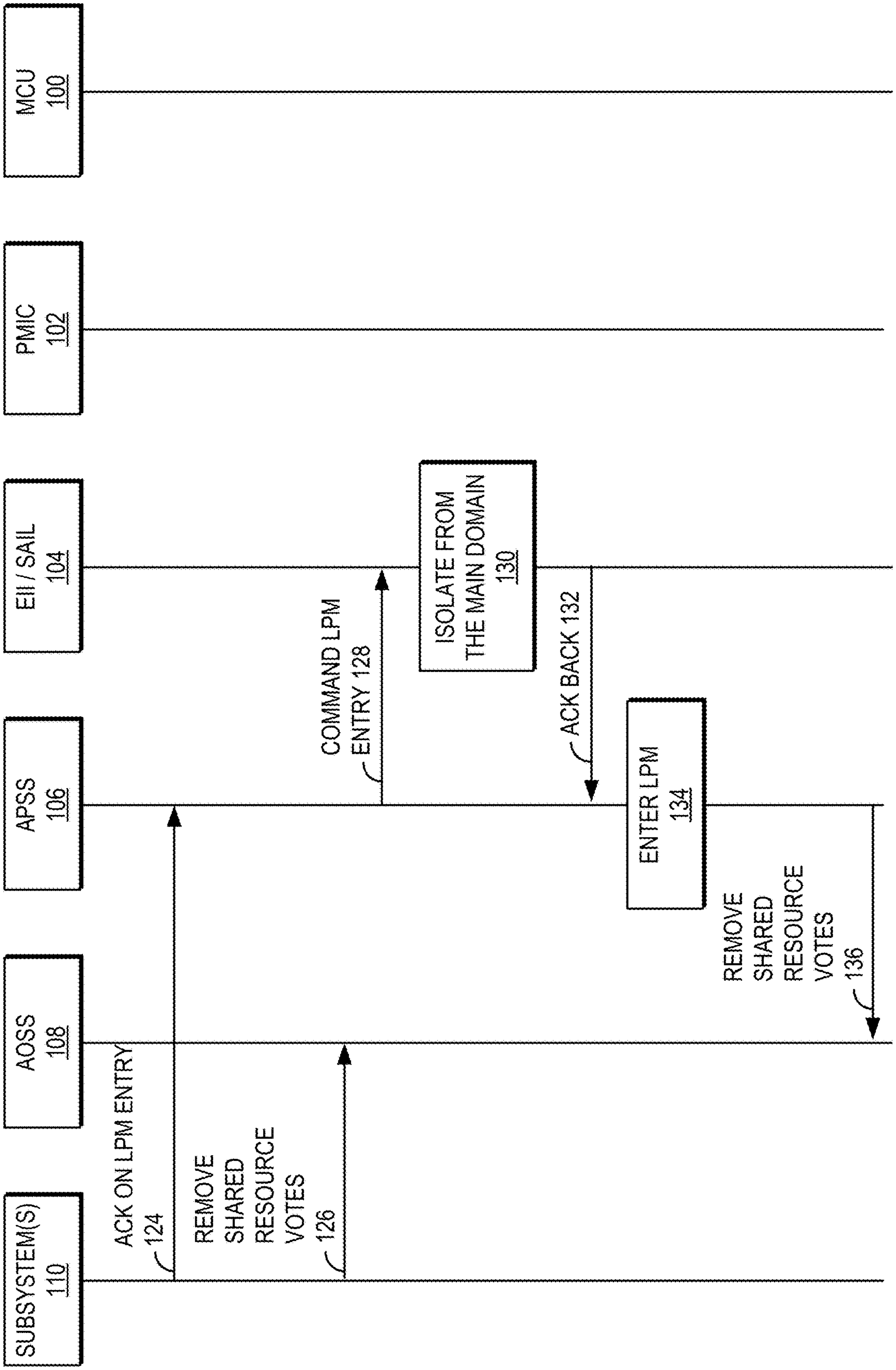
Figure 1C:
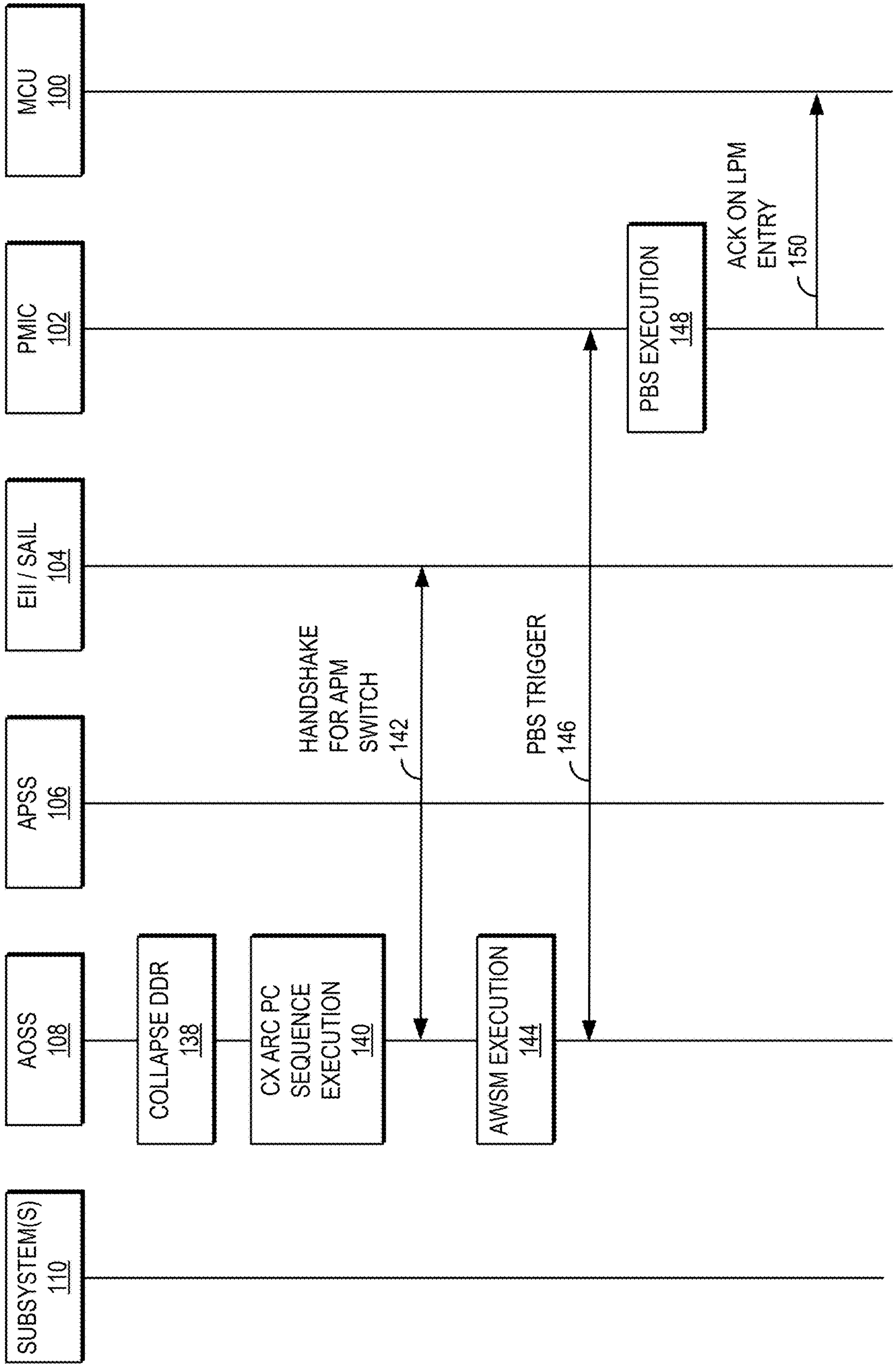

Before discussing aspects of a processor-based device configured to avoid commanded SoC sleep entry failure as disclosed herein, the exemplary operations and communications flows within of a conventional SoC when attempting to enter a commanded LPM are first discussed. In this regard, FIGS. 1A-1C provides a communications flow diagram illustrating exemplary automotive SoC elements each represented by a vertical line, with operations performed by each element represented by boxes and communications between elements represented by arrows. These elements include a microcontroller unit (MCU) circuit (captioned as "MCU" in FIGS. 1A-1C) 100 that handles low-level control, real-time tasks, and power management of the SoC; a Power Management Integrated Circuit (PMIC) circuit (captioned as "PMIC" in FIGS. 1A-1C) 102 that is responsible for managing and optimizing power delivery to the various elements of the SoC; and an Electrically Isolated Island (EII)/Safety Island (SAIL) circuit (captioned as "EII/SAIL" in FIGS. 1A-1C) 104, which is an electrically isolated portion of the SoC configured to isolate critical functions of the SoC. The elements further include an Application Processor Subsystem (APSS) circuit (captioned as "APSS" in FIGS. 1A-1C) 106 that executes an operating system of the SoC, manages system resources, and handles general-purpose computing tasks; an Always-On Subsystem (AOSS) circuit (captioned as "AOSS" in FIGS. 1A-1C) 108, which is a dedicated part of the SoC which consumes extremely low power levels, and which is responsible for maintaining essential functions while the rest of the SoC is powered down; and one or more subsystem circuits (captioned as "SUBSYSTEM(S)" in FIGS. 1A-1C) 110, each of which performs a specific set of functionality for the SoC.

In the example of FIG. 1A, the process of performing a commanded LPM is initiated when the MCU circuit 100 sends an Ignition Off signal to the APSS circuit 106 (e.g., in response to a driver turning off an engine of a vehicle containing the SoC), as indicated by arrow 112. Upon receiving the Ignition Off signal, the APSS circuit 106 executes Original Equipment Manufacturer (OEM) software to determine an appropriate LPM to run, as indicated by box 114. The APSS circuit 106 then transmits an IPC commanding LPM entry to each subsystem circuit 110, as indicated by arrow 116.

Each subsystem circuit 110, upon receiving the IPC, first enables its idle LPM, as indicated by box 118. Each subsystem circuit 110 also disables any active wakeup interrupts, as indicated by box 120. Each subsystem circuit 110 is then allowed to enter its LPM (e.g., as its executing and scheduled processes complete and the subsystem circuit 110 goes idle), as indicated by box 122. The communications flow diagram then continues in FIG. 1B.

Turning now to FIG. 1B, once each subsystem circuit 110 is ready to enter LPM, it transmits an acknowledgement (ACK) signal to the APSS circuit 106, as indicated by arrow 124. Each subsystem circuit 110 also sends a signal to the AOSS circuit 108 to remove its shared resource votes used for arbitration of shared resources, as indicated by arrow 126. The APSS circuit 106 subsequently transmits an IPC commanding LPM entry to the EII/SAIL circuit 104, as indicated by arrow 128.

Upon receiving the LPM entry command from the APSS circuit 106, the EII/SAIL circuit 104 isolates itself from the SoC's main domain, as indicated by box 130. The EII/SAIL circuit 104 then transmits an ACK signal to the APSS circuit 106, as indicated by arrow 132. The APSS circuit 106 begins entering its LPM, as indicated by box 134, and also sends a signal to the AOSS circuit 108 to remove its shared resource votes used for arbitration of shared resources, as indicated by arrow 136. The communications flow diagram then continues in FIG. 1C.

Referring now to FIG. 1C, the AOSS circuit 108 performs a power collapse operation on a Double Data Rate (DDR) memory device of the SoC, as indicated by box 138. The AOSS circuit 108 also performs core logic (CX) ARC PC sequence execution when no active votes remain on the CX rail (and thus the CX rail can be power-collapsed and turned off), as indicated by box 140. The AOSS circuit 108 exchanges a handshake for power multiplexor (APM) switch with the EII/SAIL circuit 104 to ensure that transition from the CX power domain to an embedded memory (MX) power domain occurs properly, as indicated by arrow 142. The AOSS circuit 108 then performs AOSS wake/sleep manager (AWSM) execution to enable the AOSS circuit 108 to enter a sleep mode as part of the SoC LPM, as indicated by box 144. A Programmable Boot Sequence (PBS) trigger is then exchanged between the AOSS circuit 108 and the PMIC circuit 102, as indicated by arrow 146. The PMIC circuit 102 performs PBS execution as a last step of the SoC LPM to power-collapse rails and set regulator modes correctly, as indicated by box 148. Finally, upon successful entry into LPM, the PMIC circuit 102 transmits an ACK signal to the MCU circuit 100, as indicated by arrow 150.

As noted above, though, successful entry into LPM may not be guaranteed even when using the commanded mode of LPM entry. For instance, the subsystem circuits 110 may include timers or interrupts that are non-deferable, and thereby prevent the subsystem circuit from entering its idle LPM. As a result, the SoC is also prevented from entering into its SoC-level sleep state, which can result in the entire SoC suffering a crash. In addition to interrupting the normal operation of the SoC, a SoC crash also causes an increased number of warm boots of the SoC, negatively affecting the SoC's power consumption.

Figure 2:
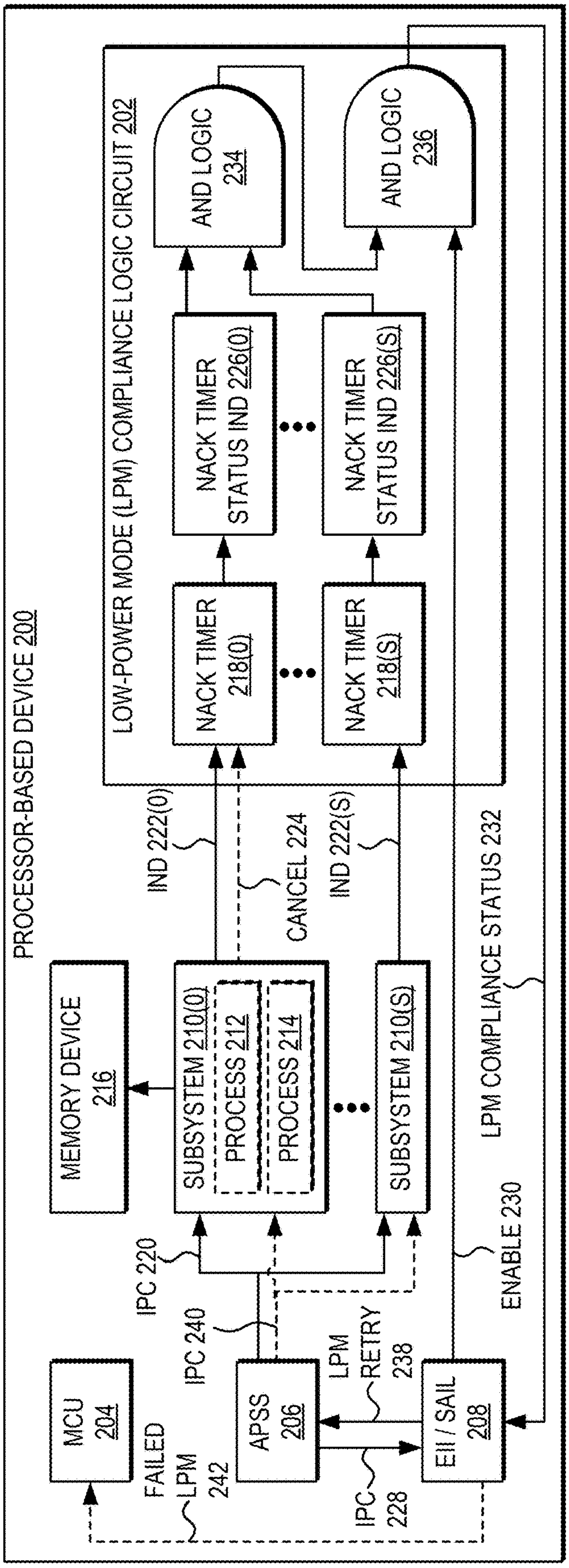
FIG. 2 is a diagram illustrating a processor-based device including an LPM compliance logic circuit configured to avoid commanded SoC sleep entry failure, according to some aspects.

Accordingly, in this regard, FIG. 2 illustrates a processor-based device 200 that includes an LPM compliance logic circuit (captioned as "LOW-POWER MODE (LPM) COMPLIANCE LOGIC CIRCUIT" in FIG. 2) 202 that is configured to operate in conjunction with other elements of the processor-based device to avoid commanded SoC sleep entry failure. The processor-based device 200 may comprise, e.g., a SoC, and further includes an MCU circuit (captioned as "MCU" in FIG. 2) 204, an APSS circuit (captioned as "APSS" in FIG. 2) 206, and an EII/SAIL circuit (captioned as "EII/SAIL" in FIG. 2) 208 that correspond in functionality to the MCU circuit 100, the APSS circuit 106, and the EII/SAIL circuit 104, respectively, described above with respect to FIG. 1. The processor-based device 200 further comprises a plurality of subsystem circuits (captioned as "SUBSYSTEM" in FIG. 2) 210(0)-210(S), each of which is configured to perform a specified subset of functionality of the processor-based device 200, including executing processes such as processes 212 and 214. Additionally, the processor-based device 200 includes a memory device 216, which may comprise a DDR memory device, as a non-limiting example. The LPM compliance logic circuit 202 comprises a plurality of NACK timers 218(0)-218(S), each of which corresponds to one of the subsystem circuits 210(0)-210(S).

The processor-based device 200 of FIG. 2 and the constituent elements thereof may encompass any one of known digital logic elements, semiconductor circuits, processing cores, and/or memory structures, among other elements, or combinations thereof. Embodiments described herein are not restricted to any particular arrangement of elements, and the disclosed techniques may be easily extended to various structures and layouts on semiconductor sockets or packages. It is to be understood that some embodiments of the processor-based device 200 may include elements in addition to those illustrated in FIG. 2. For example, the processor-based device 200 may further include one or more instruction caches, unified caches, controller circuits, interconnect buses, and/or additional memory devices, caches, and/or controller circuits that are not shown in FIG. 2 for the sake of clarity.

In exemplary operation, the APSS circuit 206 transmits an IPC 220 commanding LPM entry to each of the subsystem circuits 210(0)-210(S). Upon receiving the IPC 220, the subsystem circuits 210(0)-210(S) each transmits a corresponding indication (captioned as "IND" in FIG. 2) 222(0)-222(S) to the LPM compliance logic circuit 202 to start the corresponding NACK timer 218(0)-218(S). To further facilitate entry into LPM, some aspects may provide that subsystem circuits such as the subsystem circuit 210(0) may identify a process being executed by the subsystem circuit 210(0), such as the process 212, as a terminable process, and, in response, may terminate the process 212. In some aspects, the subsystem circuit 210(0) may identify a process being executed by the subsystem circuit 210(0), such as the process 214, as a non-terminable process. In that event, the subsystem circuit 210(0) places the process 214 in a hibernation state in the memory device 216. This may entail, for example, storing sufficient data relating to a current context and internal state of the process 214 to enable the process 214 to be recreated and restarted during a wake procedure.

Upon receiving the indications 222(0)-222(S), the LPM compliance logic circuit 202 starts each of the NACK timers 218(0)-218(S). During countdown, if a subsystem circuit such as the subsystem circuit 210(0) determines that its entry into the LPM was successful, the subsystem circuit 210(0) transmits a cancellation indication (captioned as "CANCEL" in FIG. 2) 224 to the LPM compliance logic circuit 202 to cancel the corresponding NACK timer 218(0). Based on the state of the NACK timers 218(0)-218(S), the LPM compliance logic circuit 202 generates a corresponding plurality of NACK timer status indications (captioned as "NACK TIMER STATUS IND" in FIG. 2) 226(0)-226(S). Each of the NACK timer status indications 226(0)-226(S) is set to a first value if the corresponding NACK timer 218(0)-218(S) is cancelled by the corresponding subsystem circuit 210(0)-210(S) upon entry into an LPM, and is set to a second value if the corresponding NACK timer 218(0)-218(S) expires without being cancelled. In some aspects, the first value may comprise a value of true or one (1), while the second value may comprise a value of false or zero (0), as non-limiting examples.

In some aspects, the APSS circuit 206 transmits an IPC 228 commanding LPM entry to the EII/SAIL circuit 208. On receiving the IPC 228, the EII/SAIL circuit 208 transmits an enable indication (captioned as "ENABLE" in FIG. 2) 230 to the LPM compliance logic circuit 202. In response to receiving the enable indication 230, the LPM compliance logic circuit 202 generates an LPM compliance status indication (captioned as "LPM COMPLIANCE STATUS" in FIG. 2) 232 that indicates whether all of the subsystem circuits 210(0)-210(S) were able to successfully enter LPM. To generate the LPM compliance status indication 232, the LPM compliance logic circuit 202 in some aspects may use an AND logic circuit (captioned as "AND LOGIC" in FIG. 2) 234 to perform a logical AND operation on the plurality of NACK timer status indications 226(0)-226(S), and further may use an AND logic circuit (captioned as "AND LOGIC" in FIG. 2) 236 to perform a logical AND operation on the output of the AND logic circuit 234 and the enable indication 230. The LPM compliance logic circuit 202 then transmits the LPM compliance status indication 232 to the EII/SAIL circuit 208.

Some aspects may provide that the EII/SAIL circuit 208 waits for expiration of a failure window timeout to provide sufficient time for the subsystem circuits 210(0)-210(S) to enter LPM. After expiration of the failure window timeout, the EII/SAIL circuit 208 receives the LPM compliance status indication 232 from the LPM compliance logic circuit 202. If the LPM compliance status indication 232 indicates that all subsystem circuits 210(0)-210(S) successfully entered LPM (e.g., by having a value of true or one (1), as a non-limiting example), the conventional operations for continuing into a SoC sleep mode are performed. However, if the EII/SAIL circuit 208 determines that the LPM compliance status indication 232 indicates at least one failure to enter LPM (e.g., by having a value of false or zero (0), as a non-limiting example), the EII/SAIL circuit 208 in some aspects may transmit an LPM retry request (captioned as "LPM RETRY" in FIG. 2) 238 to the APSS circuit 206. Upon receiving the LPM retry request 238, the APSS circuit 206 again transmits an IPC 240 commanding LPM entry to each of the plurality of subsystem circuits 210(0)-210(S), and the operations for attempting LPM entry described above are repeated. If the EII/SAIL circuit 208 subsequently determine that the LPM retry request 238 was unsuccessful, the EII/SAIL circuit 208 may transmit a failed LPM entry notification (captioned as "FAILED LPM" in FIG. 2) 242 to the MCU circuit 204 for further handling.

FIGS. 3A-3D provide a communications flow diagram illustrating exemplary operations and communications flows between elements of the processor-based device 200 of FIG. 2 for avoiding commanded SoC sleep entry failure when attempting to enter a commanded LPM, according to some aspects. In FIGS. 3A-3D, elements are each represented by a vertical line, with operations performed by each element represented by boxes and communications between elements represented by arrows. These elements include the MCU circuit (captioned as "MCU" in FIGS. 3A-3D) 204 of FIG. 2, a PMIC circuit (captioned as "PMIC" in FIGS. 3A-3D) 300, the EII/SAIL circuit (captioned as "EII/SAIL" in FIGS. 3A-3D) 208 of FIG. 2, the LPM compliance logic circuit (captioned as "COMPLIANCE" in FIGS. 3A-3D) 202 of FIG. 2, the APSS circuit (captioned as "APSS" in FIGS. 3A-3D) 206 of FIG. 2, an AOSS circuit (captioned as "AOSS" in FIGS. 3A-3D) 302, and the subsystem circuits (captioned as "SUBSYSTEM(S)" in FIGS. 3A-3D) 210(0)-210(S) of FIG. 2.

Figure 3A:
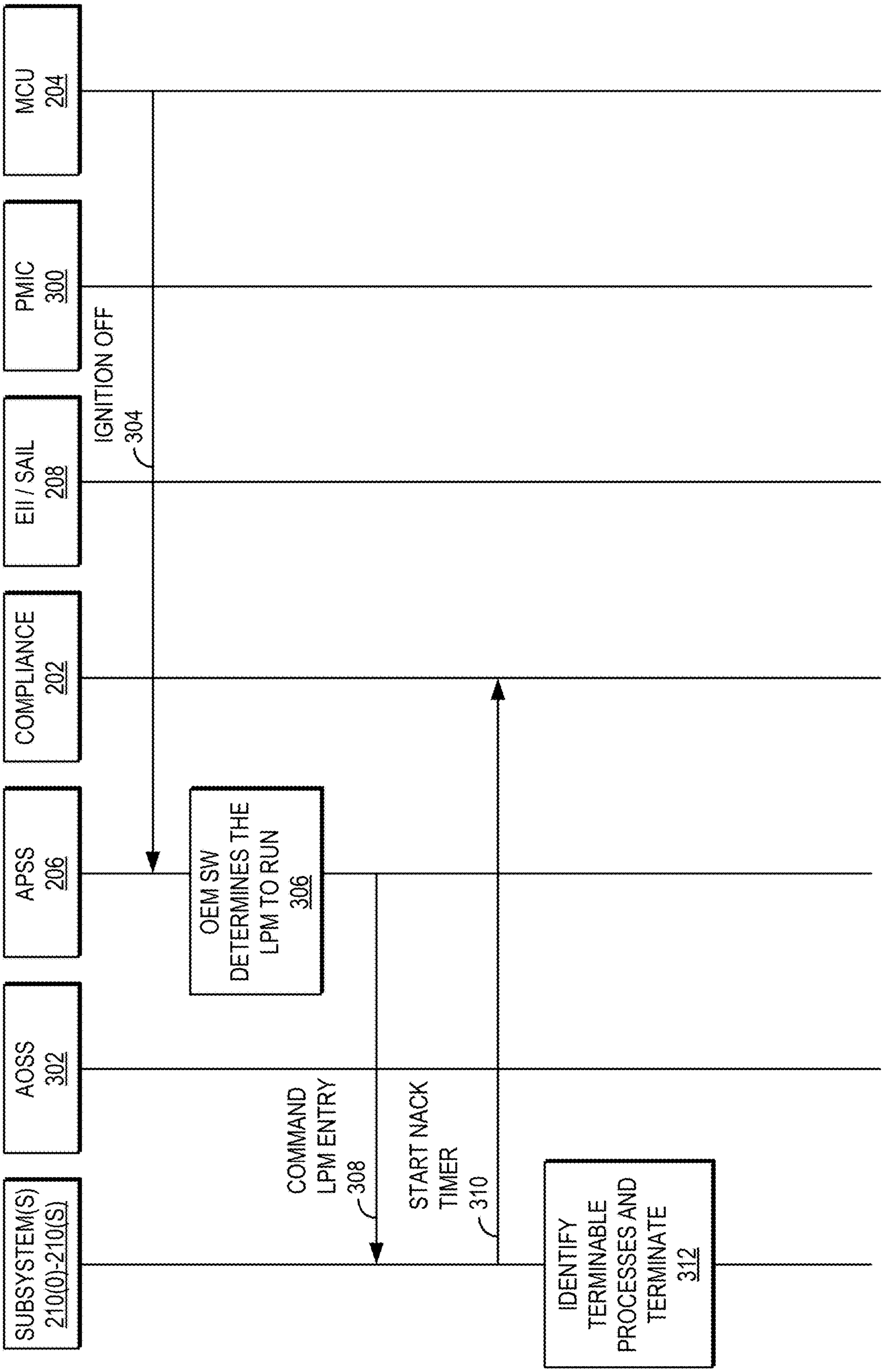
FIGS. 3A-3D provide a diagram illustrating exemplary operations and communications flows between elements of the processor-based device of FIG. 2 for avoiding commanded SoC sleep entry failure when attempting to enter a commanded LPM, according to some aspects.

In the example of FIG. 3A, the process of performing a commanded LPM is initiated when the MCU circuit 204 sends an Ignition Off signal to the APSS circuit 206, as indicated by arrow 304. Upon receiving the Ignition Off signal, the APSS circuit 206 executes OEM software to determine an appropriate LPM to run, as indicated by box 306. The APSS circuit 206 then transmits an IPC commanding LPM entry (corresponding to the IPC 220 of FIG. 2) to each of the subsystem circuits 210(0)-210(S), as indicated by arrow 308.

The subsystem circuits 210(0)-210(S) each send a corresponding indication (e.g., the indications 222(0)-222(S) of FIG. 2) to the LPM compliance logic circuit 202 to start the corresponding NACK timers (such as the NACK timers 218(0)-218(S) of FIG. 2), as indicated by arrow 310. The subsystem circuits 210(0)-210(S) in some aspects each may also identify and terminate terminable processes (e.g., the process 212 of FIG. 2), as indicated by box 312. The communications flow diagram then continues in FIG. 3B.

Figure 3B:
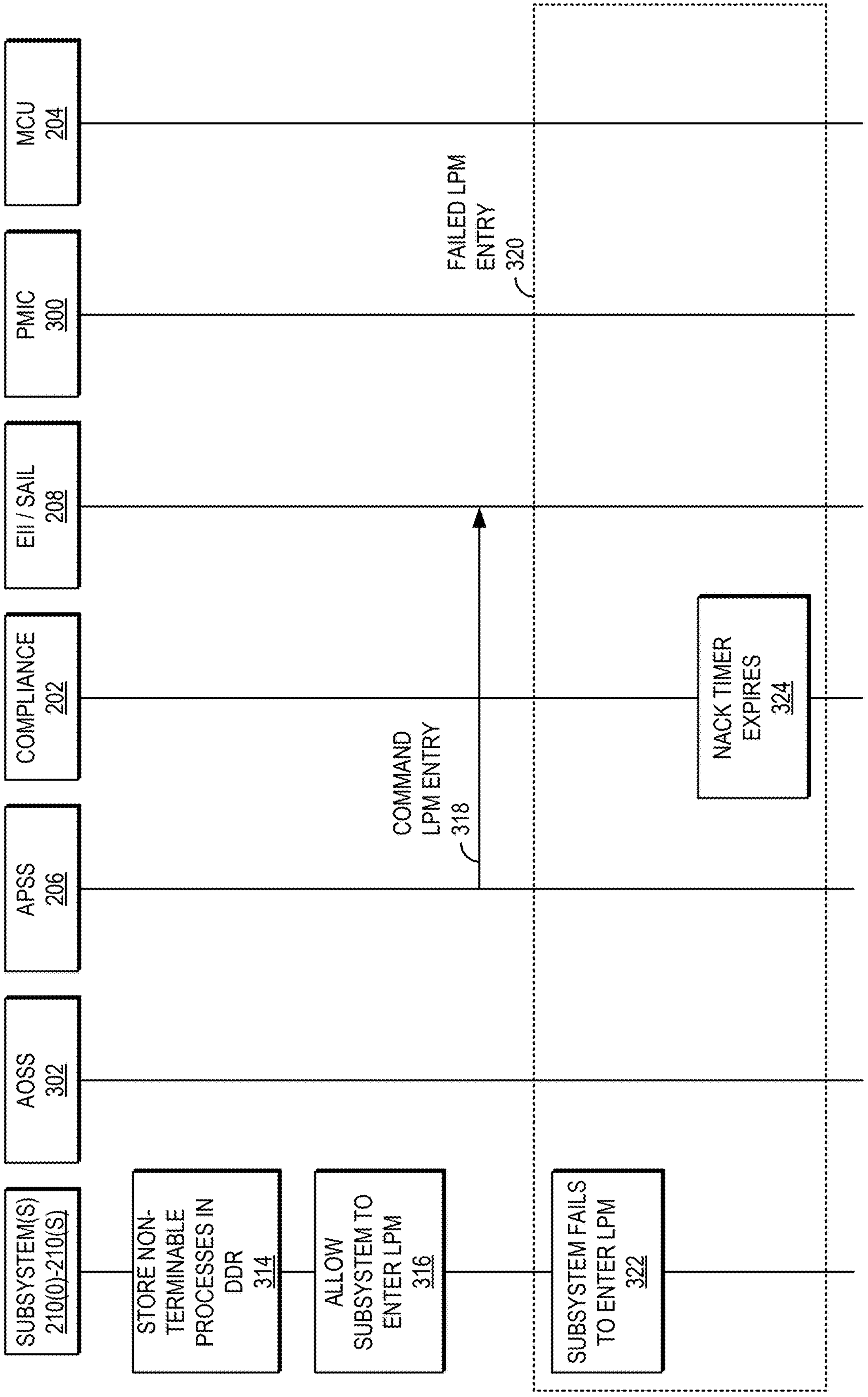

Turning now to FIG. 3B, some aspects may provide that each of the subsystem circuits 210(0)-210(S) may store non-terminable processes (e.g., the process 214 of FIG. 2) in a hibernation state in a DDR device such as the memory device 216 of FIG. 2, as indicated by box 314. Each subsystem circuit 210(0)-210(S) is then allowed to enter its LPM (e.g., as its executing and scheduled processes complete and each subsystem circuit 210(0)-210(S) goes idle), as indicated by box 316. The APSS circuit 206 transmits an IPC (e.g., the IPC 228 of FIG. 2) commanding LPM entry to the EII/SAIL circuit 208, as indicated by arrow 318.

Box 320 of FIG. 3B illustrates operations performed upon a failed LPM entry by one or more of the subsystem circuits 210(0)-210(S). First, the subsystem circuit (e.g., the subsystem circuit 210(0), as an example) fails to successfully enter LPM, as indicated by box 322. Consequently, the NACK timer 218(0) corresponding to the subsystem circuit 210(0) of the LPM compliance logic circuit 202 expires, as indicated by box 324. The communications flow diagram then continues in FIG. 3C.

Figure 3C:
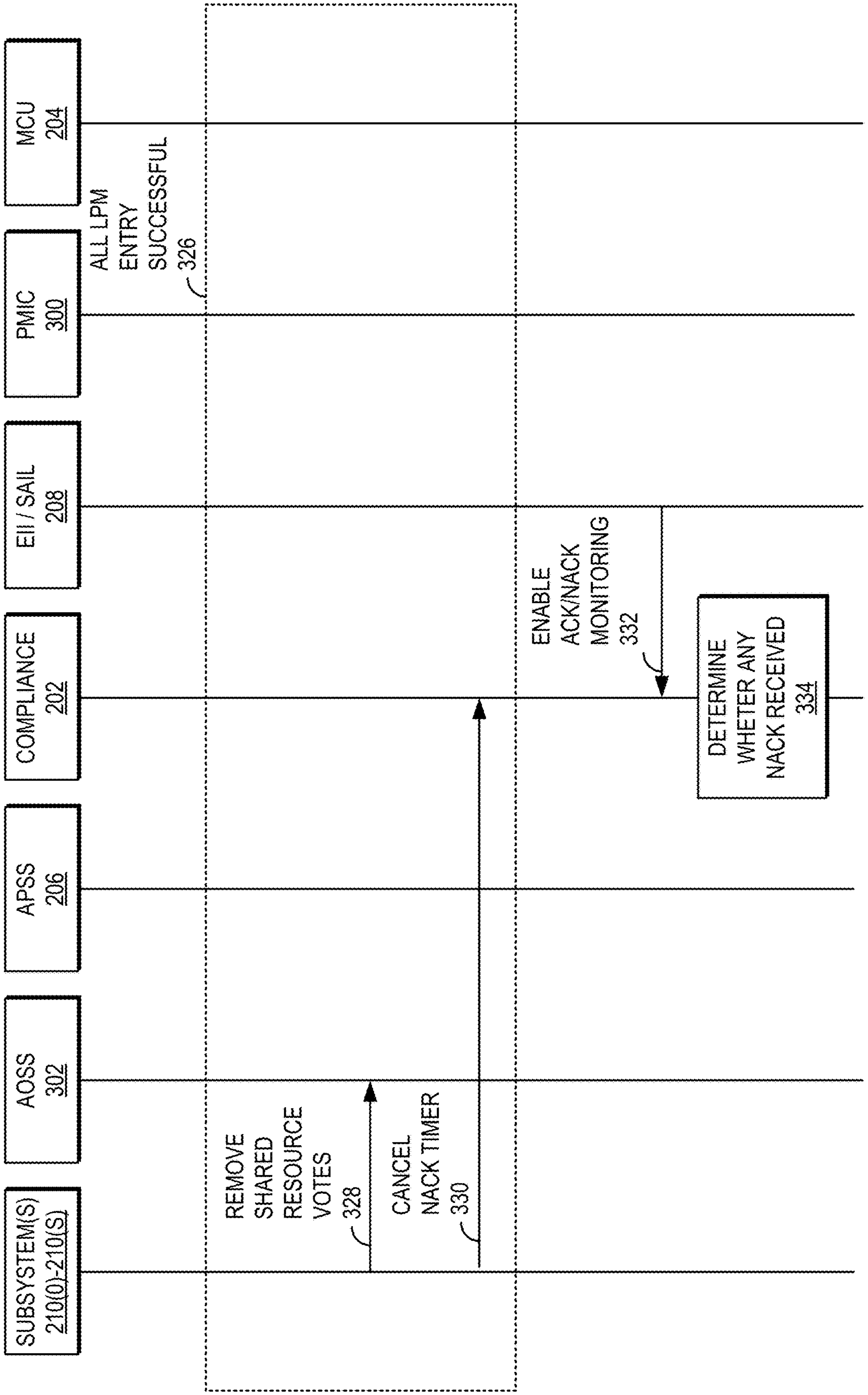

Referring now to FIG. 3C, box 326 illustrates communication flows that occur if all of the subsystem circuits 210(0)-210(S) successfully enter LPM. Each of the subsystem circuits 210(0)-210(S) sends a signal to the AOSS circuit 302 to remove its shared resource votes used for arbitration of shared resources, as indicated by arrow 328. The subsystem circuits 210(0)-210(S) also each send a cancellation indication (e.g., the cancellation indication 224 of FIG. 2) to the LPM compliance logic circuit 202 to cancel each corresponding NACK timer 218(0)-218(S), as indicated by arrow 330.

Upon expiration of a failure window timeout, the EII/SAIL circuit 208 transmits an enable indication (such as the enable indication 230 of FIG. 2) to the LPM compliance logic circuit 202, as indicated by arrow 332. The LPM compliance logic circuit 202 then determines whether any NACK was received (e.g., by generating the LPM compliance status indication 232 of FIG. 2 as described above), as indicated by box 334. The communications flow diagram then continues in FIG. 3D.

Figure 3D:
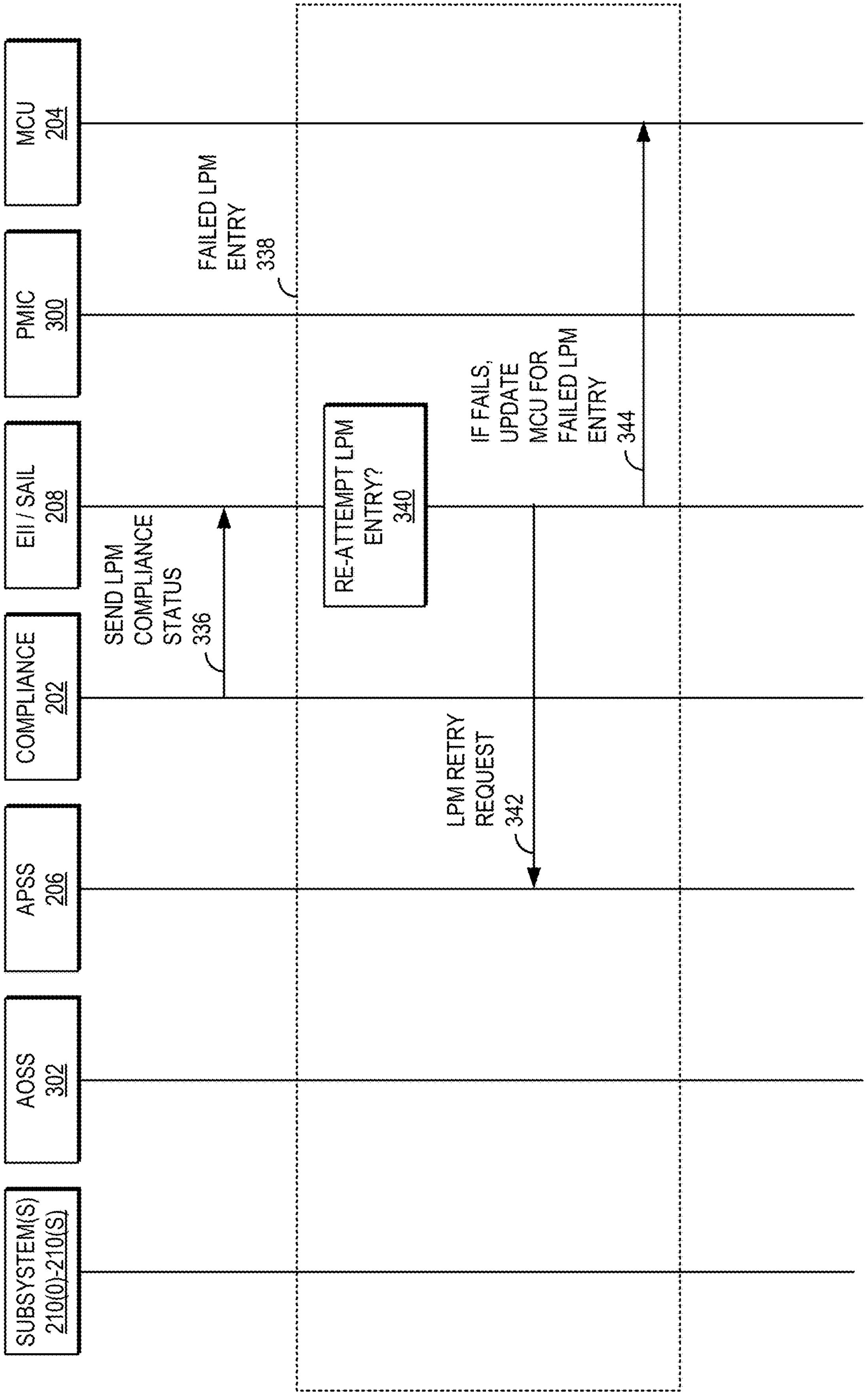

With reference now to FIG. 3D, the LPM compliance logic circuit 202 transmits the LPM compliance status indication 232 to the EII/SAIL circuit 208, as indicated by arrow 336. If the LPM compliance status indication 232 indicates that one or more of the subsystem circuits 210(0)-210(S) failed to enter LPM, the operations and communications in box 338 may take place. The EII/SAIL circuit 208 determines, based on the LPM compliance status indication 232, whether LPM entry should be re-attempted, as indicated by box 340. If so, the EII/SAIL circuit 208 transmits an LPM retry request (e.g., the LPM retry request 238 of FIG. 2) to the APSS circuit 206, as indicated by arrow 342. The operations and communications beginning with box 306 in FIG. 3A are then performed again. At the end, if the EII/SAIL circuit 208 determines again that one or more of the subsystem circuits 210(0)-210(S) failed to enter LPM, the EII/SAIL circuit 208 transmits a failed LPM entry notification (such as the failed LPM entry notification 242 of FIG. 2) to the MCU circuit 204, as indicated by arrow 344. Note that, if the EII/SAIL circuit 208 determines in box 340 that LPM entry does not need to be re-attempted, the operations and communications beginning with box 130 of FIG. 1B are performed in conventional fashion.

To illustrate operations performed by elements of the processor-based device 200 of FIG. 2 for avoiding commanded SoC sleep entry failure according to some aspects, FIGS. 4A-4E provide a flowchart showing exemplary operations 400. For the sake of clarity, elements of FIGS. 2 and 3A-3D are referenced in describing FIGS. 4A-4E. It is to be understood that some aspects may provide that some operations illustrated in FIGS. 4A-4E may be performed in an order other than that illustrated herein, and/or may be omitted.

Figure 4A:
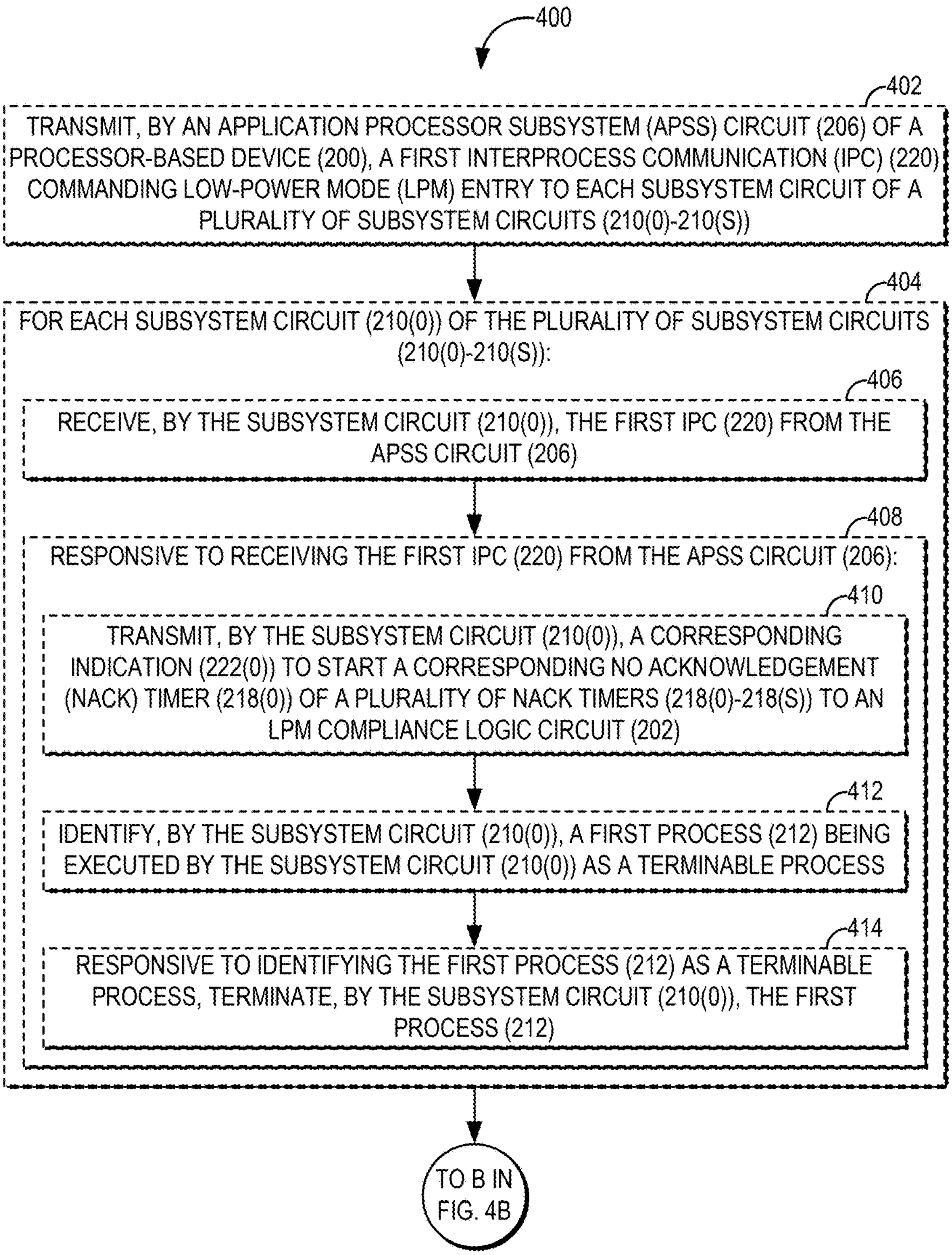
FIGS. 4A-4E is a flowchart illustrating exemplary operations performed by the processor-based device of FIG. 2 for avoiding commanded SoC sleep entry failure, according to some aspects.

The exemplary operations 400 according to some aspects begin in FIG. 4A with an APSS circuit (e.g., the APSS circuit 206 of FIG. 2) of a processor-based device (such as the processor-based device 200 of FIG. 2) transmitting a first IPC (e.g., the IPC 220 of FIG. 2) commanding LPM entry to each subsystem circuit of a plurality of subsystem circuits (such as the subsystem circuits 210(0)-210(S) of FIG. 2) (block 402). In such aspects, a series of operations are then performed for each subsystem circuit (e.g., the subsystem circuit 210(0) of FIG. 2) of the plurality of subsystem circuits 210(0)-210(S) (block 404). The subsystem circuit 210(0) receives the first IPC 220 from the APSS circuit 206 (block 406). In response to receiving the first IPC 220 from the APSS circuit 206, the subsystem circuit 210(0) performs a series of operations (block 408). The subsystem circuit 210(0) transmits a corresponding indication (such as the indication 222(0) of FIG. 2) to start a corresponding NACK timer (such as the NACK timer 218(0) of FIG. 2) of a plurality of NACK timers (e.g., the NACK timers 218(0)-218(S) of FIG. 2) to an LPM compliance logic circuit (such as the LPM compliance logic circuit 202 of FIG. 2) (block 410).

In some such aspects, the subsystem circuit 210(0) may identify a first process (e.g., the process 212 of FIG. 2) being executed by the subsystem circuit 210(0) as a terminable process (block 412). In response to identifying the first process 212 as a terminable process, the subsystem circuit 210(0) terminates the first process 212 (block 414). The exemplary operations 400 in some aspects may continue at block 416 of FIG. 4B.

Figure 4B:
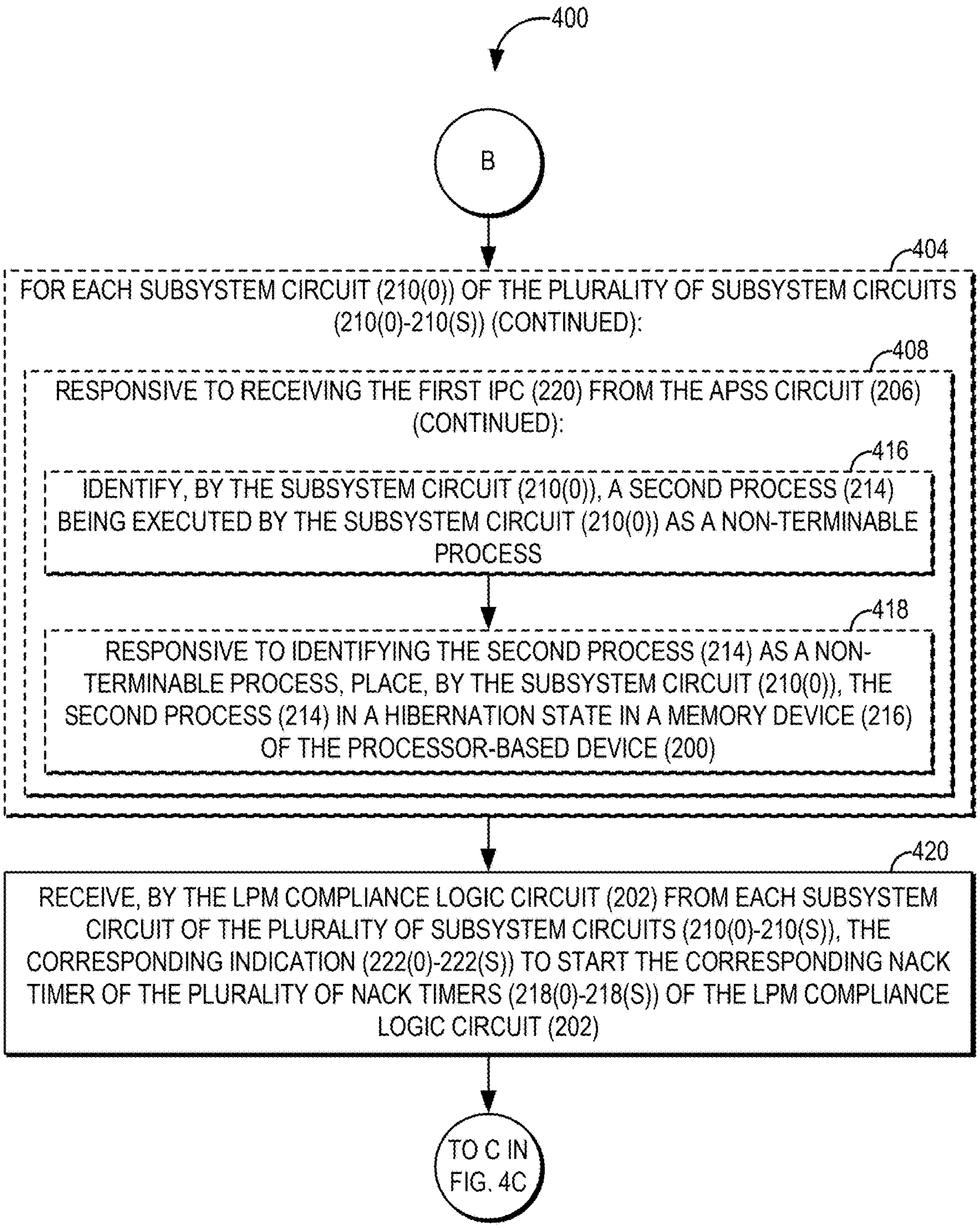

Turning now to FIG. 4B, the series of operations that may be performed for each subsystem circuit 210(0) of the plurality of subsystem circuits 210(0)-210(S) continues (block 404). The subsystem circuit 210(0) according to some aspects continues to perform the series of operations in response to receiving the first IPC 220 from the APSS circuit 206 (block 408). In such aspects, the subsystem circuit 210(0) may identify a second process (such as the process 214 of FIG. 2) being executed by the subsystem circuit 210(0) as a non-terminable process (block 416). In response to identifying the second process 214 as a non-terminable process, the subsystem circuit 210(0) places the second process 214 in a hibernation state in a memory device (such as the memory device 216 of FIG. 2) of the processor-based device 200 (block 418).

The LPM compliance logic circuit 202 receives, from each subsystem circuit of the plurality of subsystem circuits 210(0)-210(S), the corresponding indication 222(0)-222(S) to start the corresponding NACK timer of the plurality of NACK timers 218(0)-218(S) of the LPM compliance logic circuit 202 (block 420). The exemplary operations 400 in some aspects may continue at block 422 of FIG. 4C.

Figure 4C:
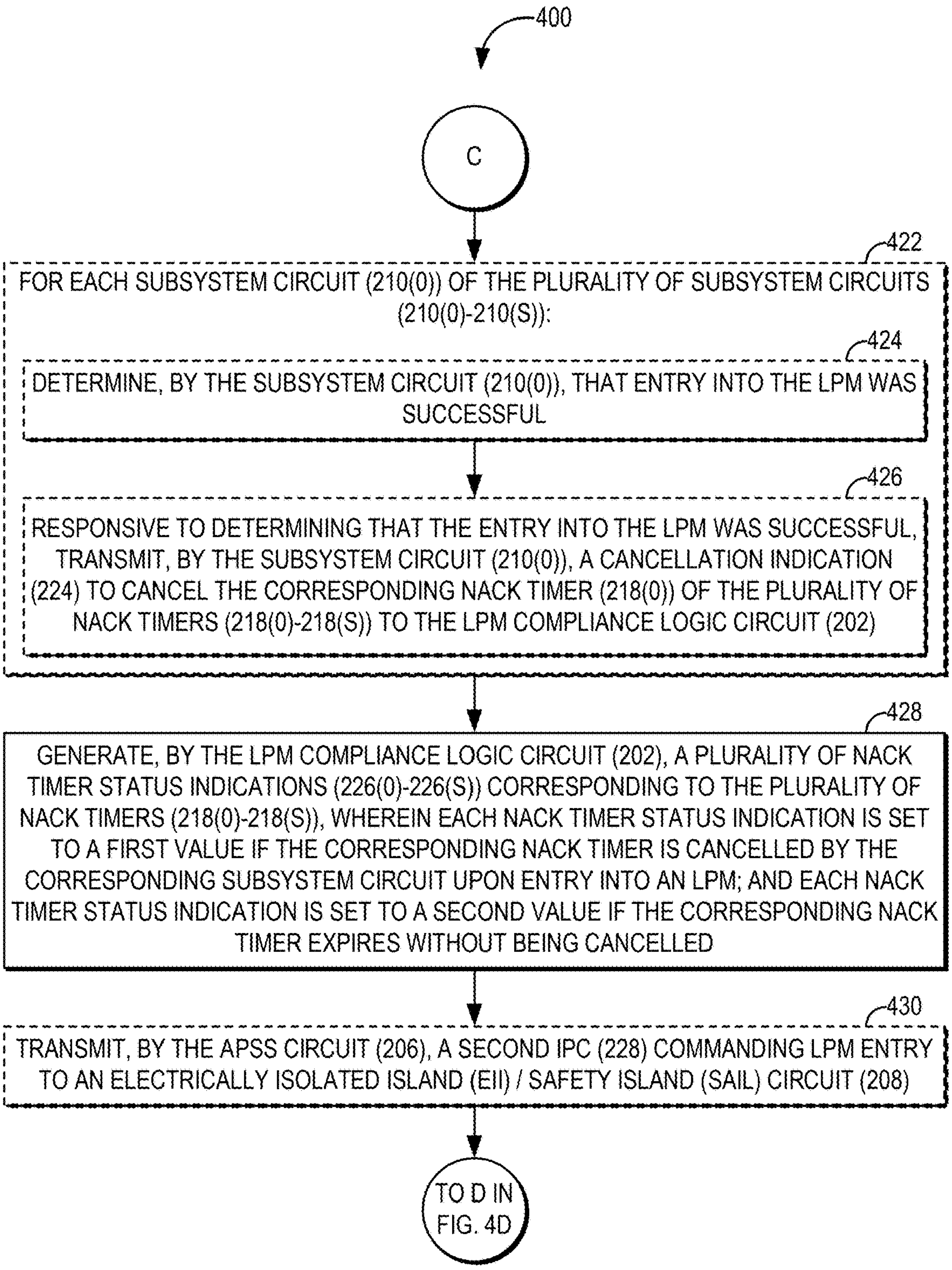

Referring now to FIG. 4C, in some aspects, a series of operations may be performed for each subsystem circuit 210(0) of the plurality of subsystem circuits 210(0)-210(S) (block 422). In such aspects, the subsystem circuit 210(0) may determine that entry into the LPM was successful (block 424). In response, the subsystem circuit 210(0) transmits a cancellation indication (e.g., the cancellation indication 224 of FIG. 2) to cancel the corresponding NACK timer of the plurality of NACK timers 218(0)-218(S) to the LPM compliance logic circuit 202 (block 426).

The LPM compliance logic circuit 202 next generates a plurality of NACK timer status indications (such as the NACK timer status indications 226(0)-226(S) of FIG. 2) corresponding to the plurality of NACK timers 218(0)-218(S), wherein each NACK timer status indication is set to a first value if the corresponding NACK timer is cancelled by the corresponding subsystem circuit upon entry into an LPM, and each NACK timer status indication is set to a second value if the corresponding NACK timer expires without being cancelled (block 428). According to some aspects, the APSS circuit 206 may transmit a second IPC (e.g., the IPC 228 of FIG. 2) commanding LPM entry to an EII/SAIL circuit (such as the EII/SAIL circuit 208 of FIG. 2) (block 430). The exemplary operations 400 in some such aspects may continue at block 432 of FIG. 4D.

Figure 4D:
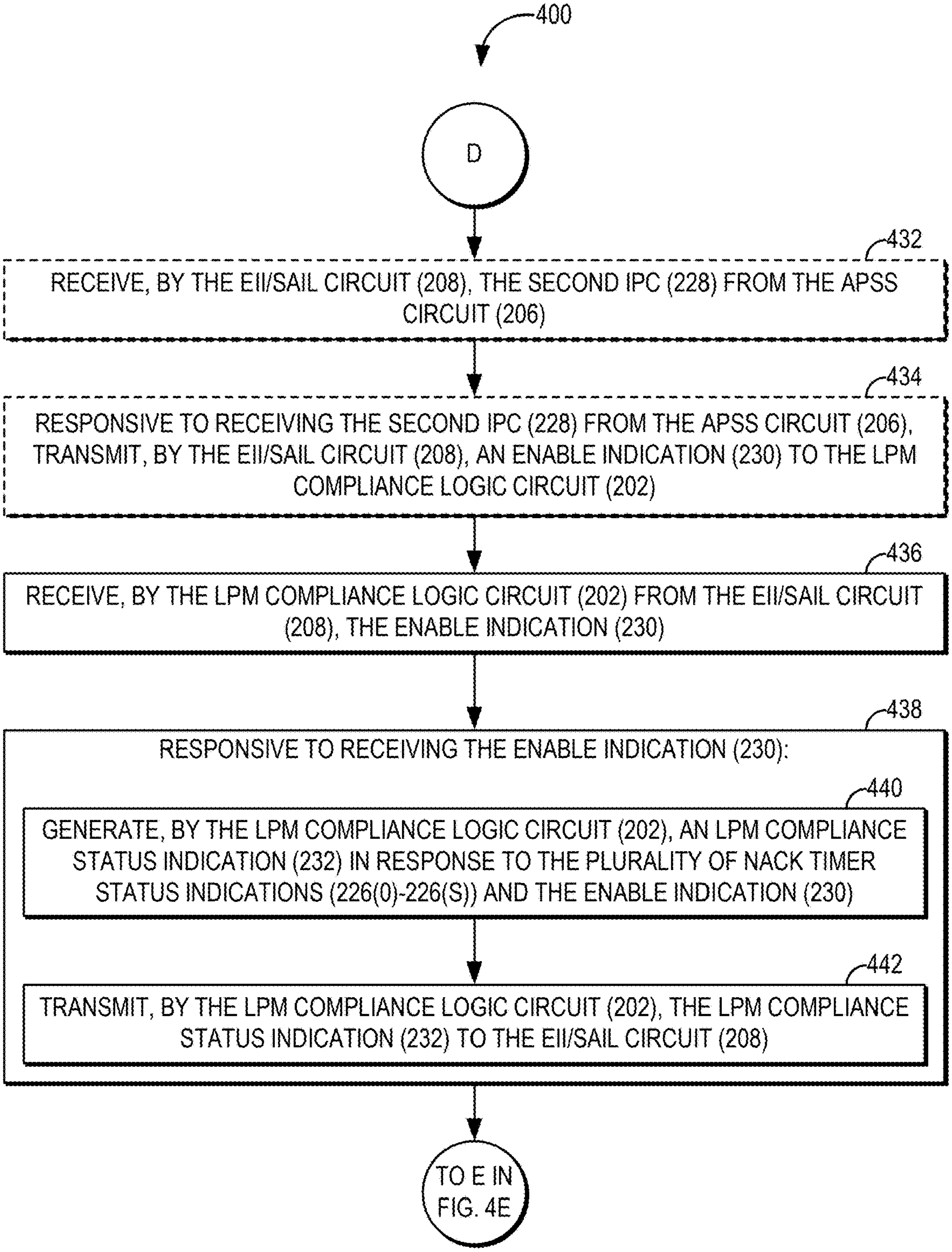

With reference now to FIG. 4D, the EII/SAIL circuit 208 in some aspects receives the second IPC 228 from the APSS circuit 206 (block 432). In response to receiving the second IPC 228 from the APSS circuit 206, the EII/SAIL circuit 208 transmits an enable indication (such as the enable indication 230 of FIG. 2) to the LPM compliance logic circuit 202 (block 434). The LPM compliance logic circuit 202 then receives, from the EII/SAIL circuit 208, the enable indication 230 (block 436). In response to receiving the enable indication 230, the LPM compliance logic circuit 202 performs a series of operations (block 438). The LPM compliance logic circuit 202 generate an LPM compliance status indication (e.g., the LPM compliance status indication 232 of FIG. 2) in response to the plurality of NACK timer status indications 226(0)-226(S) and the enable indication 230 (block 440). The LPM compliance logic circuit 202 then transmits the LPM compliance status indication 232 to the EII/SAIL circuit 208 (block 442). The exemplary operations 400 according to some aspects may continue at block 444 of FIG. 4E.

Figure 4E:
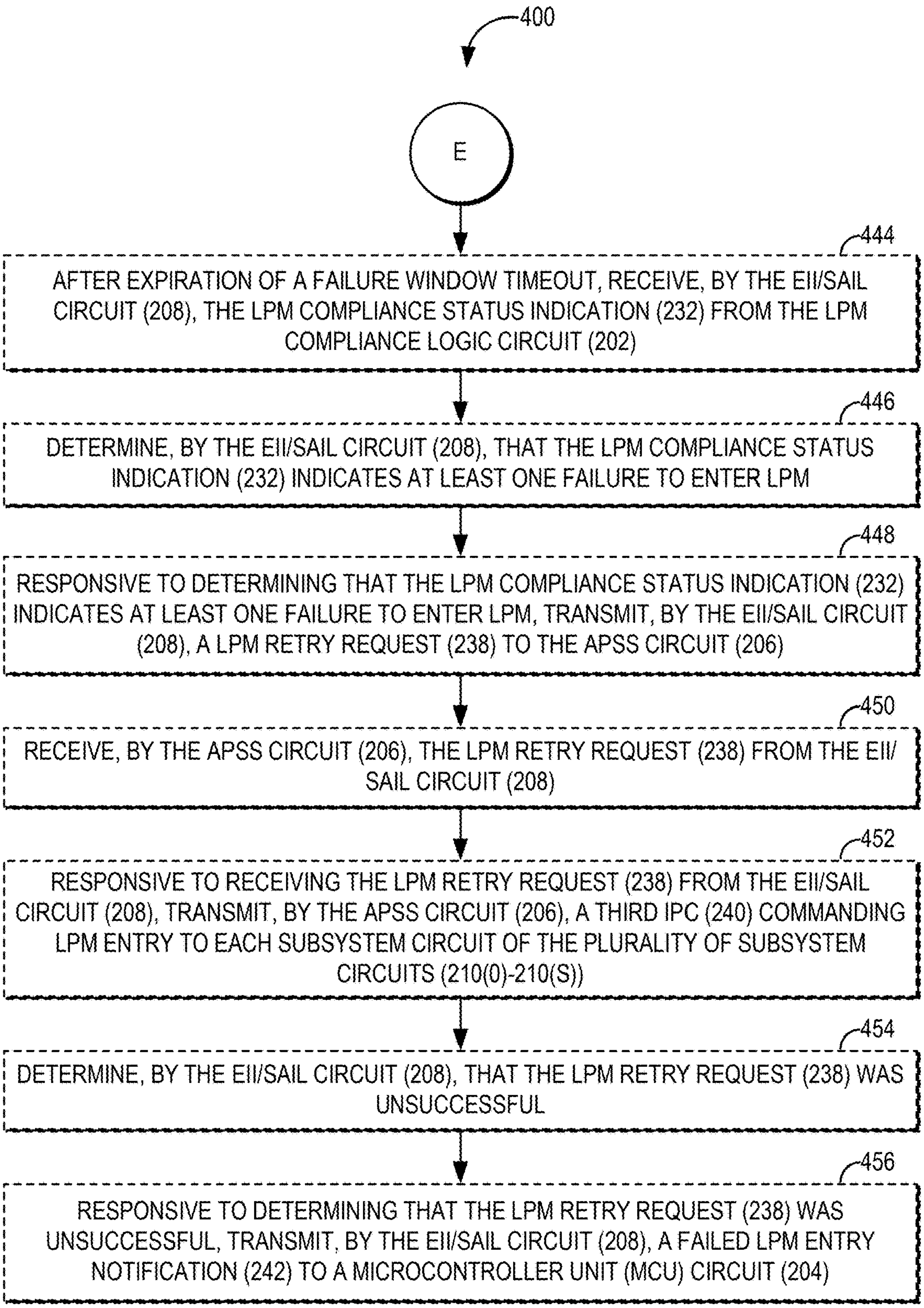

Turning now to FIG. 4E, some aspects may provide that, after expiration of a failure window timeout, the EII/SAIL circuit 208 receives the LPM compliance status indication 232 from the LPM compliance logic circuit 202 (block 444). The EII/SAIL circuit 208 in some such aspects determines that the LPM compliance status indication 232 indicates at least one failure to enter LPM (block 446). Responsive to determining that the LPM compliance status indication 232 indicates at least one failure to enter LPM, the EII/SAIL circuit 208 transmits an LPM retry request (such as the LPM retry request 238 of FIG. 2) to the APSS circuit 206 (block 448). The APSS circuit 206 receives the LPM retry request 238 from the EII/SAIL circuit 208 (block 450). In response to receiving the LPM retry request 238 from the EII/SAIL circuit 208, the APSS circuit 206 transmits a third IPC (e.g., the IPC 240 of FIG. 2) commanding LPM entry to each subsystem circuit of the plurality of subsystem circuits 210(0)-210(S) (block 452). The EII/SAIL circuit 208 may subsequently determine that the LPM retry request 238 was unsuccessful (block 454). Responsive to determining that the LPM retry request 238 was unsuccessful, the EII/SAIL circuit 208 may transmit a failed LPM entry notification (such as the failed LPM entry notification 242 of FIG. 2) to an MCU circuit (e.g., the MCU circuit 204 of FIG. 2) (block 456).

The processor-based device according to aspects disclosed herein and discussed with reference to FIGS. 2 and 3A-3D may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 5:
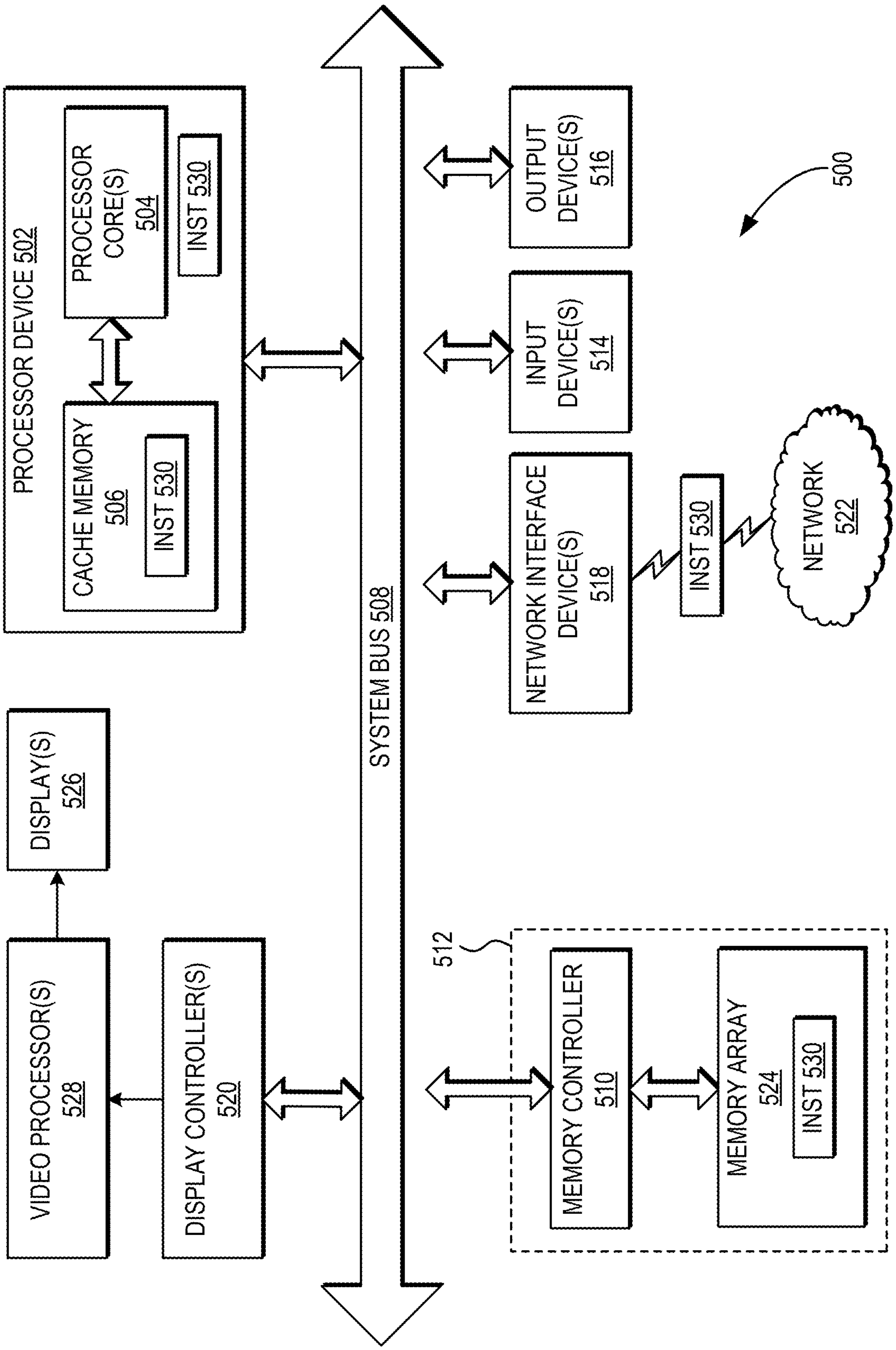
FIG. 5 is a block diagram of an exemplary processor-based device that can include the processor-based device of FIG. 2.

In this regard, FIG. 5 illustrates an example of a processor-based device 500, which corresponds in functionality to the processor-based device 200 of FIG. 2. In this example, the processor-based device 500 includes a processor device 502 that comprises one or more processor cores 504 coupled to a cache memory 506. The processor device 502 is also coupled to a system bus 508 and can intercouple devices included in the processor-based device 500. As is well known, the processor device 502 communicates with these other devices by exchanging address, control, and data information over the system bus 508. For example, the processor device 502 can communicate bus transaction requests to a memory controller 510. Although not illustrated in FIG. 5, multiple system buses 508 could be provided, wherein each system bus 508 constitutes a different fabric.

Other devices may be connected to the system bus 508. As illustrated in FIG. 5, these devices can include a memory system 512, one or more input devices 514, one or more output devices 516, one or more network interface devices 518, and one or more display controllers 520, as examples. The input device(s) 514 can include any type of input device, including, but not limited to, input keys, switches, voice processors, etc. The output device(s) 516 can include any type of output device, including, but not limited to, audio, video, other visual indicators, etc. The network interface device(s) 518 can be any devices configured to allow exchange of data to and from a network 522. The network 522 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 518 can be configured to support any type of communications protocol desired. The memory system 512 can include the memory controller 510 coupled to one or more memory arrays 524.

The processor device 502 may also be configured to access the display controller(s) 520 over the system bus 508 to control information sent to one or more displays 526. The display controller(s) 520 sends information to the display(s) 526 to be displayed via one or more video processors 528, which process the information to be displayed into a format suitable for the display(s) 526. The display(s) 526 can include any type of display, including, but not limited to, a cathode ray tube (CRT), a liquid crystal display (LCD), a plasma display, a light emitting diode (LED) display, etc.

The processor-based device 500 in FIG. 5 may include a set of instructions (captioned as "INST" in FIG. 5) 530 that may be executed by the processor device 502 for any application desired according to the instructions. The instructions 530 may be stored in the memory system 512, the processor device 502, and/or the cache memory 506, each of which may comprise an example of a non-transitory computer-readable medium. The instructions 530 may also reside, completely or at least partially, within the memory system 512 and/or within the processor device 502 during their execution. The instructions 530 may further be transmitted or received over the network 522, such that the network 522 may comprise an example of a computer-readable medium.

While the computer-readable medium is described in an exemplary embodiment herein to be a single medium, the term "computer-readable medium" should be taken to include a single medium or multiple media (e.g., a centralized or distributed database, and/or associated caches and servers) that store the set of instructions 530. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

It is to be understood that the terms "top," "upper," "above," and "bottom," "lower," "below," where used herein, are relative terms and are not meant to limit or imply a strict orientation. A "top" or "upper" or "above" referenced element does not always need to be oriented to be above a "bottom," or "lower," or "below" referenced element with respect to ground, and vice versa. An element referenced as "top," "upper," "above," or "bottom," "lower," "below," may be on top or bottom relative to that example only and the particular illustrated example. An element referenced as "top" or "upper" or "above" "bottom," "lower," "below," another element does not have to be with respect to ground, and vice versa. An element referenced as "top" or "upper" or "above" may be above or below such other referenced element, relative to that example only and the particular illustrated example. For example, if a particular object that is discussed as at "top," or "upper" or "above" another object, and such particular object is flipped 180 degrees, then such particular object would then be oriented as at "bottom," or "lower" or "below" such other object.

Further, an object being "adjacent" as discussed herein relates to an object being beside or next to another stated object. Adjacent objects may not be directly physically coupled to each other. An object can be directly adjacent to another object which means that such objects are directly beside or next to the other object without another object or layer being intervening or disposed between the directly adjacent objects. An object can be indirectly or non-directly adjacent to another object which means that such objects are not directly beside or directly next to each other, but there is an intervening object or layer disposed between the non-directly adjacent objects.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A processor-based device, comprising:
   - an Electrically Isolated Island (EII)/Safety Island (SAIL) circuit;
   - a plurality of subsystem circuits; and
   - a low-power mode (LPM) compliance logic circuit comprising a plurality of No Acknowledgement (NACK) timers each corresponding to a subsystem circuit of the plurality of subsystem circuits;
   - the LPM compliance logic circuit configured to:
     - receive, from each subsystem circuit of the plurality of subsystem circuits, a corresponding indication to start the corresponding NACK timer of the plurality of NACK timers;
     - generate a plurality of NACK timer status indications corresponding to the plurality of NACK timers, wherein:
       - each NACK timer status indication is set to a first value if the corresponding NACK timer is cancelled by the corresponding subsystem circuit upon entry into an LPM; and
       - each NACK timer status indication is set to a second value if the corresponding NACK timer expires without being cancelled;
     - receive, from the EII/SAIL circuit, an enable indication; and
     - responsive to receiving the enable indication:
       - generate an LPM compliance status indication in response to the plurality of NACK timer status indications and the enable indication; and
       - transmit the LPM compliance status indication to the EII/SAIL circuit.

2. The processor-based device of clause 1, further comprising an Application Processor Subsystem (APSS) circuit configured to transmit a first interprocess communication (IPC) commanding LPM entry to each subsystem circuit of the plurality of subsystem circuits;
   - wherein each subsystem circuit of the plurality of subsystem circuits is configured to:
     - receive the first IPC from the APSS circuit; and
     - responsive to receiving the first IPC from the APSS circuit, transmit the corresponding indication to start the corresponding NACK timer of the plurality of NACK timers to the LPM compliance logic circuit.

3. The processor-based device of clause 2, wherein each subsystem circuit is further configured to, further responsive to receiving the first IPC from the APSS circuit:
   - identify a first process being executed by the subsystem circuit as a terminable process; and
   - responsive to identifying the first process as a terminable process, terminate the first process.

4. The processor-based device of any one of clauses 2-3, wherein each subsystem circuit is further configured to, further responsive to receiving the first IPC from the APSS circuit:
   - identify a second process being executed by the subsystem circuit as a non-terminable process; and
   - responsive to identifying the second process as a non-terminable process, place the second process in a hibernation state in a memory device of the processor-based device.

5. The processor-based device of any one of clauses 2-4, wherein each subsystem circuit of the plurality of subsystem circuits is further configured to:
   - determine whether entry into the LPM was successful; and
   - responsive to determining that the entry into the LPM was successful, transmit a cancellation indication to cancel the corresponding NACK timer of the plurality of NACK timers to the LPM compliance logic circuit.

6. The processor-based device of any one of clauses 2-5, wherein:
   - the APSS circuit is further configured to transmit a second IPC commanding LPM entry to the EII/SAIL circuit; and
   - the EII/SAIL circuit is configured to:
     - receive the second IPC from the APSS circuit; and
     - responsive to receiving the second IPC from the APSS circuit:
       - transmit the enable indication to the LPM compliance logic circuit; and
       - after expiration of a failure window timeout, receive the LPM compliance status indication from the LPM compliance logic circuit.

7. The processor-based device of clause 6, wherein:
   - the EII/SAIL circuit is further configured to:
     - determine whether the LPM compliance status indication indicates at least one failure to enter LPM; and
     - responsive to determining that the LPM compliance status indication indicates at least one failure to enter LPM, transmit an LPM retry request to the APSS circuit; and
   - the APSS circuit is further configured to:

receive the LPM retry request from the EII/SAIL circuit; and responsive to receiving the LPM retry request from the EII/SAIL circuit, transmit a third IPC commanding LPM entry to each subsystem circuit of the plurality of subsystem circuits.

8. The processor-based device of clause 7, wherein:

the processor-based device further comprises a microcontroller unit (MCU) circuit; and the EII/SAIL circuit is further configured to:

determine whether the LPM retry request was unsuccessful; and responsive to determining that the LPM retry request was unsuccessful, transmit a failed LPM entry notification to the MCU circuit.

9. The processor-based device of any one of clauses 1-8, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A method for avoiding commanded System-on-Chip (SoC) sleep entry failure in processor-based devices, comprising:

receiving, by a low-power mode (LPM) compliance logic circuit from each subsystem circuit of a plurality of subsystem circuits, a corresponding indication to start a corresponding No Acknowledgement (NACK) timer of a plurality of NACK timers of the LPM compliance logic circuit;

generating, by the LPM compliance logic circuit, a plurality of NACK timer status indications corresponding to the plurality of NACK timers, wherein:

each NACK timer status indication is set to a first value if the corresponding NACK timer is cancelled by the corresponding subsystem circuit upon entry into an LPM; and each NACK timer status indication is set to a second value if the corresponding NACK timer expires without being cancelled;

receiving, by the LPM compliance logic circuit from an Electrically Isolated Island (EII)/Safety Island (SAIL) circuit, an enable indication; and responsive to receiving the enable indication:

generating, by the LPM compliance logic circuit, an LPM compliance status indication in response to the plurality of NACK timer status indications and the enable indication; and transmitting, by the LPM compliance logic circuit, the LPM compliance status indication to the EII/SAIL circuit.

11. The method of clause 10, further comprising:

transmitting, by an Application Processor Subsystem (APSS) circuit, a first interprocess communication (IPC) commanding LPM entry to each subsystem circuit of the plurality of subsystem circuits; and for each subsystem circuit of the plurality of subsystem circuits:

receiving, by the subsystem circuit, the first IPC from the APSS circuit; and responsive to receiving the first IPC from the APSS circuit, transmitting, by the subsystem circuit, the corresponding indication to start the corresponding NACK timer of the plurality of NACK timers to the LPM compliance logic circuit.

12. The method of clause 11, further comprising, for at least one subsystem circuit of the plurality of subsystem circuits:

further responsive to receiving the first IPC from the APSS circuit:

identifying, by the subsystem circuit, a first process being executed by the subsystem circuit as a terminable process; and responsive to identifying the first process as a terminable process, terminating, by the subsystem circuit, the first process.

13. The method of any one of clauses 11-12, further comprising, for at least one subsystem circuit of the plurality of subsystem circuits:

further responsive to receiving the first IPC from the APSS circuit:

identifying, by the subsystem circuit, a second process being executed by the subsystem circuit as a non-terminable process; and responsive to identifying the second process as a non-terminable process, placing, by the subsystem circuit, the second process in a hibernation state in a memory device.

14. The method of any one of clauses 11-13, further comprising, for at least one subsystem circuit of the plurality of subsystem circuits:

determining, by the subsystem circuit, that entry into the LPM was successful; and responsive to determining that the entry into the LPM was successful, transmitting, by the subsystem circuit, a cancellation indication to cancel the corresponding NACK timer of the plurality of NACK timers to the LPM compliance logic circuit.

15. The method of any one of clauses 11-14, further comprising:

transmitting, by the APSS circuit, a second IPC commanding LPM entry to the EII/SAIL circuit;

receiving, by the EII/SAIL circuit, the second IPC from the APSS circuit; and responsive to receiving the second IPC from the APSS circuit:

transmitting, by the EII/SAIL circuit, the enable indication to the LPM compliance logic circuit; and after expiration of a failure window timeout, receiving, by the EII/SAIL circuit, the LPM compliance status indication from the LPM compliance logic circuit.

16. The method of clause 15, further comprising:

determining, by the EII/SAIL circuit, that the LPM compliance status indication indicates at least one failure to enter LPM;

responsive to determining that the LPM compliance status indication indicates at least one failure to enter LPM, transmitting, by the EII/SAIL circuit, an LPM retry request to the APSS circuit;

receiving, by the APSS circuit, the LPM retry request from the EII/SAIL circuit; and responsive to receiving the LPM retry request from the EII/SAIL circuit, transmitting, by the APSS circuit, a third IPC commanding LPM entry to each subsystem circuit of the plurality of subsystem circuits.

17. The method of clause 16, further comprising:

determining, by the EII/SAIL circuit, that the LPM retry request was unsuccessful; and responsive to determining that the LPM retry request was unsuccessful, transmitting, by the EII/SAIL circuit, a failed LPM entry notification to a microcontroller unit (MCU) circuit.

18. A non-transitory computer-readable medium, having stored thereon computer-executable instructions that, when executed by a processor device of a processor-based device, cause the processor device to:

receive, from each subsystem circuit of a plurality of subsystem circuits, a corresponding indication to start a corresponding No Acknowledgement (NACK) timer of a plurality of NACK timers;

generate a plurality of NACK timer status indications corresponding to the plurality of NACK timers, wherein:

each NACK timer status indication is set to a first value if the corresponding NACK timer is cancelled by the corresponding subsystem circuit upon entry into a low-power mode (LPM); and each NACK timer status indication is set to a second value if the corresponding NACK timer expires without being cancelled;

receive an enable indication from an Electrically Isolated Island (EII)/Safety Island (SAIL) circuit; and responsive to receiving the enable indication:

generate an LPM compliance status indication in response to the plurality of NACK timer status indications and the enable indication; and transmit the LPM compliance status indication to the EII/SAIL circuit.

19. The non-transitory computer-readable medium of clause 18, wherein the computer-executable instructions further cause the processor device to:

transmit a first interprocess communication (IPC) commanding LPM entry to each subsystem circuit of the plurality of subsystem circuits;

receive the first IPC; and responsive to receiving the first IPC, transmit the corresponding indication to start the corresponding NACK timer of the plurality of NACK timers.

20. The non-transitory computer-readable medium of clause 19, wherein the computer-executable instructions further cause the processor device to:

determine whether entry into the LPM was successful; and responsive to determining that the entry into the LPM was successful, transmit a cancellation indication to cancel the corresponding NACK timer of the plurality of NACK timers.

What is claimed is:

1. A processor-based device, comprising:

an Electrically Isolated Island (EII)/Safety Island (SAIL) circuit;

a plurality of subsystem circuits; and a low-power mode (LPM) compliance logic circuit comprising a plurality of No Acknowledgement (NACK) timers each corresponding to a subsystem circuit of the plurality of subsystem circuits;

the LPM compliance logic circuit configured to:

receive, from each subsystem circuit of the plurality of subsystem circuits, a corresponding indication to start the corresponding NACK timer of the plurality of NACK timers;

generate a plurality of NACK timer status indications corresponding to the plurality of NACK timers, wherein:

each NACK timer status indication is set to a first value if the corresponding NACK timer is cancelled by the corresponding subsystem circuit upon entry into an LPM; and each NACK timer status indication is set to a second value if the corresponding NACK timer expires without being cancelled;

receive, from the EII/SAIL circuit, an enable indication; and responsive to receiving the enable indication:

generate an LPM compliance status indication in response to the plurality of NACK timer status indications and the enable indication; and transmit the LPM compliance status indication to the EII/SAIL circuit.

2. The processor-based device of claim 1, further comprising an Application Processor Subsystem (APSS) circuit configured to transmit a first interprocess communication (IPC) commanding LPM entry to each subsystem circuit of the plurality of subsystem circuits;

wherein each subsystem circuit of the plurality of subsystem circuits is configured to:

receive the first IPC from the APSS circuit; and responsive to receiving the first IPC from the APSS circuit, transmit the corresponding indication to start the corresponding NACK timer of the plurality of NACK timers to the LPM compliance logic circuit.

3. The processor-based device of claim 2, wherein each subsystem circuit is further configured to, further responsive to receiving the first IPC from the APSS circuit:

identify a first process being executed by the subsystem circuit as a terminable process; and responsive to identifying the first process as a terminable process, terminate the first process.

4. The processor-based device of claim 2, wherein each subsystem circuit is further configured to, further responsive to receiving the first IPC from the APSS circuit:

identify a second process being executed by the subsystem circuit as a non-terminable process; and responsive to identifying the second process as a non-terminable process, place the second process in a hibernation state in a memory device of the processor-based device.

5. The processor-based device of claim 2, wherein each subsystem circuit of the plurality of subsystem circuits is further configured to:

determine whether entry into the LPM was successful; and responsive to determining that the entry into the LPM was successful, transmit a cancellation indication to cancel the corresponding NACK timer of the plurality of NACK timers to the LPM compliance logic circuit.

6. The processor-based device of claim 2, wherein:

the APSS circuit is further configured to transmit a second IPC commanding LPM entry to the EII/SAIL circuit; and the EII/SAIL circuit is configured to:

receive the second IPC from the APSS circuit; and responsive to receiving the second IPC from the APSS circuit:

transmit the enable indication to the LPM compliance logic circuit; and after expiration of a failure window timeout, receive the LPM compliance status indication from the LPM compliance logic circuit.

7. The processor-based device of claim 6, wherein:

the EII/SAIL circuit is further configured to:

determine whether the LPM compliance status indication indicates at least one failure to enter LPM; and responsive to determining that the LPM compliance status indication indicates at least one failure to enter LPM, transmit an LPM retry request to the APSS circuit; and the APSS circuit is further configured to:

receive the LPM retry request from the EII/SAIL circuit; and responsive to receiving the LPM retry request from the EII/SAIL circuit, transmit a third IPC commanding LPM entry to each subsystem circuit of the plurality of subsystem circuits.

8. The processor-based device of claim 7, wherein:

the processor-based device further comprises a microcontroller unit (MCU) circuit; and the EII/SAIL circuit is further configured to:

determine whether the LPM retry request was unsuccessful; and responsive to determining that the LPM retry request was unsuccessful, transmit a failed LPM entry notification to the MCU circuit.

9. The processor-based device of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

10. A method for avoiding commanded System-on-Chip (SoC) sleep entry failure in processor-based devices, comprising:

receiving, by a low-power mode (LPM) compliance logic circuit from each subsystem circuit of a plurality of subsystem circuits, a corresponding indication to start a corresponding No Acknowledgement (NACK) timer of a plurality of NACK timers of the LPM compliance logic circuit;

generating, by the LPM compliance logic circuit, a plurality of NACK timer status indications corresponding to the plurality of NACK timers, wherein:

each NACK timer status indication is set to a first value if the corresponding NACK timer is cancelled by the corresponding subsystem circuit upon entry into an LPM; and each NACK timer status indication is set to a second value if the corresponding NACK timer expires without being cancelled;

receiving, by the LPM compliance logic circuit from an Electrically Isolated Island (EII)/Safety Island (SAIL) circuit, an enable indication; and responsive to receiving the enable indication:

generating, by the LPM compliance logic circuit, an LPM compliance status indication in response to the plurality of NACK timer status indications and the enable indication; and transmitting, by the LPM compliance logic circuit, the LPM compliance status indication to the EII/SAIL circuit.

11. The method of claim 10, further comprising:

transmitting, by an Application Processor Subsystem (APSS) circuit, a first interprocess communication (IPC) commanding LPM entry to each subsystem circuit of the plurality of subsystem circuits; and for each subsystem circuit of the plurality of subsystem circuits:

receiving, by the subsystem circuit, the first IPC from the APSS circuit; and responsive to receiving the first IPC from the APSS circuit, transmitting, by the subsystem circuit, the corresponding indication to start the corresponding NACK timer of the plurality of NACK timers to the LPM compliance logic circuit.

12. The method of claim 11, further comprising, for at least one subsystem circuit of the plurality of subsystem circuits:

further responsive to receiving the first IPC from the APSS circuit:

identifying, by the subsystem circuit, a first process being executed by the subsystem circuit as a terminable process; and responsive to identifying the first process as a terminable process, terminating, by the subsystem circuit, the first process.

13. The method of claim 11, further comprising, for at least one subsystem circuit of the plurality of subsystem circuits:

further responsive to receiving the first IPC from the APSS circuit:

identifying, by the subsystem circuit, a second process being executed by the subsystem circuit as a non-terminable process; and responsive to identifying the second process as a non-terminable process, placing, by the subsystem circuit, the second process in a hibernation state in a memory device.

14. The method of claim 11, further comprising, for at least one subsystem circuit of the plurality of subsystem circuits:

determining, by the subsystem circuit, that entry into the LPM was successful; and responsive to determining that the entry into the LPM was successful, transmitting, by the subsystem circuit, a cancellation indication to cancel the corresponding NACK timer of the plurality of NACK timers to the LPM compliance logic circuit.

15. The method of claim 11, further comprising:

transmitting, by the APSS circuit, a second IPC commanding LPM entry to the EII/SAIL circuit;

receiving, by the EII/SAIL circuit, the second IPC from the APSS circuit; and responsive to receiving the second IPC from the APSS circuit:

transmitting, by the EII/SAIL circuit, the enable indication to the LPM compliance logic circuit; and after expiration of a failure window timeout, receiving, by the EII/SAIL circuit, the LPM compliance status indication from the LPM compliance logic circuit.

16. The method of claim 15, further comprising:

determining, by the EII/SAIL circuit, that the LPM compliance status indication indicates at least one failure to enter LPM;

responsive to determining that the LPM compliance status indication indicates at least one failure to enter LPM, transmitting, by the EII/SAIL circuit, an LPM retry request to the APSS circuit;

receiving, by the APSS circuit, the LPM retry request from the EII/SAIL circuit; and responsive to receiving the LPM retry request from the EII/SAIL circuit, transmitting, by the APSS circuit, a third IPC commanding LPM entry to each subsystem circuit of the plurality of subsystem circuits.

17. The method of claim 16, further comprising:

determining, by the EII/SAIL circuit, that the LPM retry request was unsuccessful; and responsive to determining that the LPM retry request was unsuccessful, transmitting, by the EII/SAIL circuit, a failed LPM entry notification to a microcontroller unit (MCU) circuit.

18. A non-transitory computer-readable medium, having stored thereon computer-executable instructions that, when executed by a processor device of a processor-based device, cause the processor device to:

receive, from each subsystem circuit of a plurality of subsystem circuits, a corresponding indication to start a corresponding No Acknowledgement (NACK) timer of a plurality of NACK timers;

generate a plurality of NACK timer status indications corresponding to the plurality of NACK timers, wherein:

each NACK timer status indication is set to a first value if the corresponding NACK timer is cancelled by the corresponding subsystem circuit upon entry into a low-power mode (LPM); and each NACK timer status indication is set to a second value if the corresponding NACK timer expires without being cancelled;

receive an enable indication from an Electrically Isolated Island (EII)/Safety Island (SAIL) circuit; and responsive to receiving the enable indication:

generate an LPM compliance status indication in response to the plurality of NACK timer status indications and the enable indication; and transmit the LPM compliance status indication to the EII/SAIL circuit.

19. The non-transitory computer-readable medium of claim 18, wherein the computer-executable instructions further cause the processor device to:

transmit a first interprocess communication (IPC) commanding LPM entry to each subsystem circuit of the plurality of subsystem circuits;

receive the first IPC; and responsive to receiving the first IPC, transmit the corresponding indication to start the corresponding NACK timer of the plurality of NACK timers.

20. The non-transitory computer-readable medium of claim 19, wherein the computer-executable instructions further cause the processor device to:

determine whether entry into the LPM was successful; and responsive to determining that the entry into the LPM was successful, transmit a cancellation indication to cancel the corresponding NACK timer of the plurality of NACK timers.

* * * * *